(12) United States Patent
Drumm

(10) Patent No.: US 11,624,878 B2
(45) Date of Patent: Apr. 11, 2023

(54) WAVEGUIDE-BASED IMAGE CAPTURE

(71) Applicant: Beechrock Limited, Castletown (IM)

(72) Inventor: Owen Drumm, Dublin (IE)

(73) Assignee: Beechrock Limited, Castletown (IM)

( * ) Notice: Subject to any disclaimer, the term of this patent is extended or adjusted under 35 U.S.C. 154(b) by 137 days.

(21) Appl. No.: 16/865,333

(22) Filed: May 2, 2020

(65) Prior Publication Data

US 2020/0348473 A1 Nov. 5, 2020

Related U.S. Application Data

(60) Provisional application No. 62/843,230, filed on May 3, 2019.

(51) Int. Cl.
*H04N 5/225* (2006.01)
*G02B 6/42* (2006.01)
*G06F 3/042* (2006.01)

(52) U.S. Cl.
CPC ............. *G02B 6/4214* (2013.01); *G02B 6/42* (2013.01); *G06F 3/0421* (2013.01); *H04N 5/2253* (2013.01)

(58) Field of Classification Search
CPC ....... G02B 6/4214; G02B 6/42; G06F 3/0421; G06F 3/042; G06F 3/0428; G06F 2203/04109; H04N 5/2253
See application file for complete search history.

(56) References Cited

U.S. PATENT DOCUMENTS

| 10,401,546 | B2 | 9/2019 | Craven-Bartle et al. |
| 2002/0141462 | A1 | 10/2002 | Komeda |
| 2007/0075444 | A1* | 4/2007 | Zheng ............... H01L 24/72 257/797 |
| 2007/0201042 | A1 | 8/2007 | Eliasson et al. |
| 2008/0278460 | A1 | 11/2008 | Arnett et al. |
| 2009/0122020 | A1 | 5/2009 | Eliasson et al. |
| 2010/0110005 | A1 | 5/2010 | Chtchetinine et al. |
| 2010/0302196 | A1 | 12/2010 | Han et al. |
| 2012/0212458 | A1 | 8/2012 | Drumm |
| 2012/0230050 | A1 | 9/2012 | Kim et al. |
| 2013/0021302 | A1 | 1/2013 | Drumm |
| 2014/0253831 | A1 | 9/2014 | Craven-Bartle |
| 2015/0070327 | A1 | 3/2015 | Hsieh et al. |
| 2016/0026337 | A1 | 1/2016 | Wassvik et al. |

(Continued)

FOREIGN PATENT DOCUMENTS

| EP | 2734914 A2 | 5/2014 |
| JP | 2016-530617 A | 9/2016 |

(Continued)

OTHER PUBLICATIONS

PCT International Search Report and Written Opinion, PCT Application No. PCT/IB2018/001285, dated Mar. 4, 2019, 15 pages.

(Continued)

*Primary Examiner* — Mekonnen D Dagnew

(74) *Attorney, Agent, or Firm* — Fenwick & West LLP

(57) ABSTRACT

An imaging optical system includes an imaging device and an optical waveguide. The waveguide includes structures configured to couple light from an external environment into the waveguide. The structures direct the light to propagate in the waveguide via total internal reflection and towards the imaging device.

20 Claims, 21 Drawing Sheets

(56) References Cited

U.S. PATENT DOCUMENTS

| | | | |
|---|---|---|---|
| 2016/0069756 A1 | 3/2016 | Kim et al. | |
| 2016/0170562 A1 | 6/2016 | Tlmonen et al. | |
| 2016/0334942 A1 | 11/2016 | Wassvik | |
| 2017/0109561 A1 | 4/2017 | Wyrwas et al. | |
| 2017/0255813 A1 | 9/2017 | Chen et al. | |
| 2018/0267672 A1 | 9/2018 | Wassvik et al. | |
| 2019/0107923 A1 | 4/2019 | Drumm | |
| 2019/0138154 A1 | 5/2019 | Smith et al. | |
| 2022/0035161 A1* | 2/2022 | Sinay | G02B 27/0172 |

FOREIGN PATENT DOCUMENTS

| | | |
|---|---|---|
| KR | 10-2015-0032749 A | 3/2015 |
| KR | 10-2017-0103755 A | 9/2017 |
| WO | WO 2014/098740 A1 | 6/2014 |
| WO | WO 2015/108480 A1 | 7/2015 |
| WO | WO 2016/111707 A1 | 7/2016 |

OTHER PUBLICATIONS

PCT International Search Report and Written Opinion, PCT Application No. PCT/IB2020/000361, dated Sep. 10, 2020, 13 pages.
Japan Patent Office, Office Action, JP Patent Application No. 2020-520782, dated Oct. 18, 2022, 18 pages.
Korean Intellectual Property Office, Office Action, KR Patent Application No. 10-2020-7013174, dated Jul. 21, 2022, eight pages.
United States Office Action, U.S. Appl. No. 17/130,389, filed Sep. 7, 2021, 14 pages.
United States Office Action, U.S. Appl. No. 17/130,389, filed Mar. 23, 2022, 15 pages.

* cited by examiner

WAVEGUIDE-BASED IMAGE CAPTURE

CROSS REFERENCE TO RELATED APPLICATIONS

This application claims the benefit of priority to U.S. Provisional Patent Application No. 62/843,230, "Waveguide-Based Image Capture," filed on May 3, 2019, which is incorporated by reference.

BACKGROUND

1. Field of Art

This description generally relates to an imaging system located in front of a display, and specifically to an optical waveguide with structures that direct light from an external scene to an imaging device.

2. Description of the Related Art

Many electronic displays use cameras to enhance their functionality, for example to perform video calling and eye-tracking. These cameras are typically positioned along the periphery of the display. However, since a user typically looks at the display, a camera on the periphery has a view point that is misaligned with the direction of the user's gaze.

SUMMARY

An imaging optical system includes an imaging device and an optical waveguide. The waveguide includes structures configured to couple light from an external environment into the waveguide. The structures direct the light to propagate in the waveguide (e.g., via total internal reflection) and towards the imaging device.

In some embodiments, the imaging optical system includes an optical touch-sensitive device that determines the locations of touch events. The optical touch-sensitive device includes multiple emitters and detectors. Each emitter produces optical radiant energy which is received by the detectors. In some embodiments, the optical emitters are frequency or code-division multiplexed in a manner so that many optical sources can be received by a detector simultaneously. Alternatively, emitters are time multiplexed and are activated sequentially in a predefined sequence. Touch events disturb the optical energy transfer from emitter to detector. Variations in light transfer resulting from the touch events are captured, and are used to determine the touch events. In one aspect, information indicating which emitter-detector pairs have been disturbed by touch events is received. The light disturbance for each pair is characterized and used to determine the beams attenuation resulting from the touch events.

The emitters and detectors may be interleaved around the periphery of the touch sensitive surface. In other embodiments, the number of emitters and detectors are different and are distributed around the periphery in a defined order. The emitters and detectors may be regularly or irregularly spaced. In some cases, the emitters and/or detectors are located on less than all of the sides (e.g., one side). In some cases, the emitters and/or detectors are not physically located at the periphery. For example, couplers, such as waveguides, couple beams between the touch surface and the emitters and/or detectors. Reflectors may also be positioned around the periphery to reflect optical beams, causing the path from the emitter to the detector to pass across the surface more than once. For each emitter-detector pair, a beam may be defined by combining light rays propagating from an emitter and a detector. In some implementations, the disturbance of a beam is characterized by its transmission coefficient, and the beam attenuation is determined from the transmission coefficient.

BRIEF DESCRIPTION OF DRAWINGS

Embodiments of the present disclosure will now be described, by way of example, with reference to the accompanying drawings.

DETAILED DESCRIPTION

I. Introduction

A. Device Overview

Figure 1:
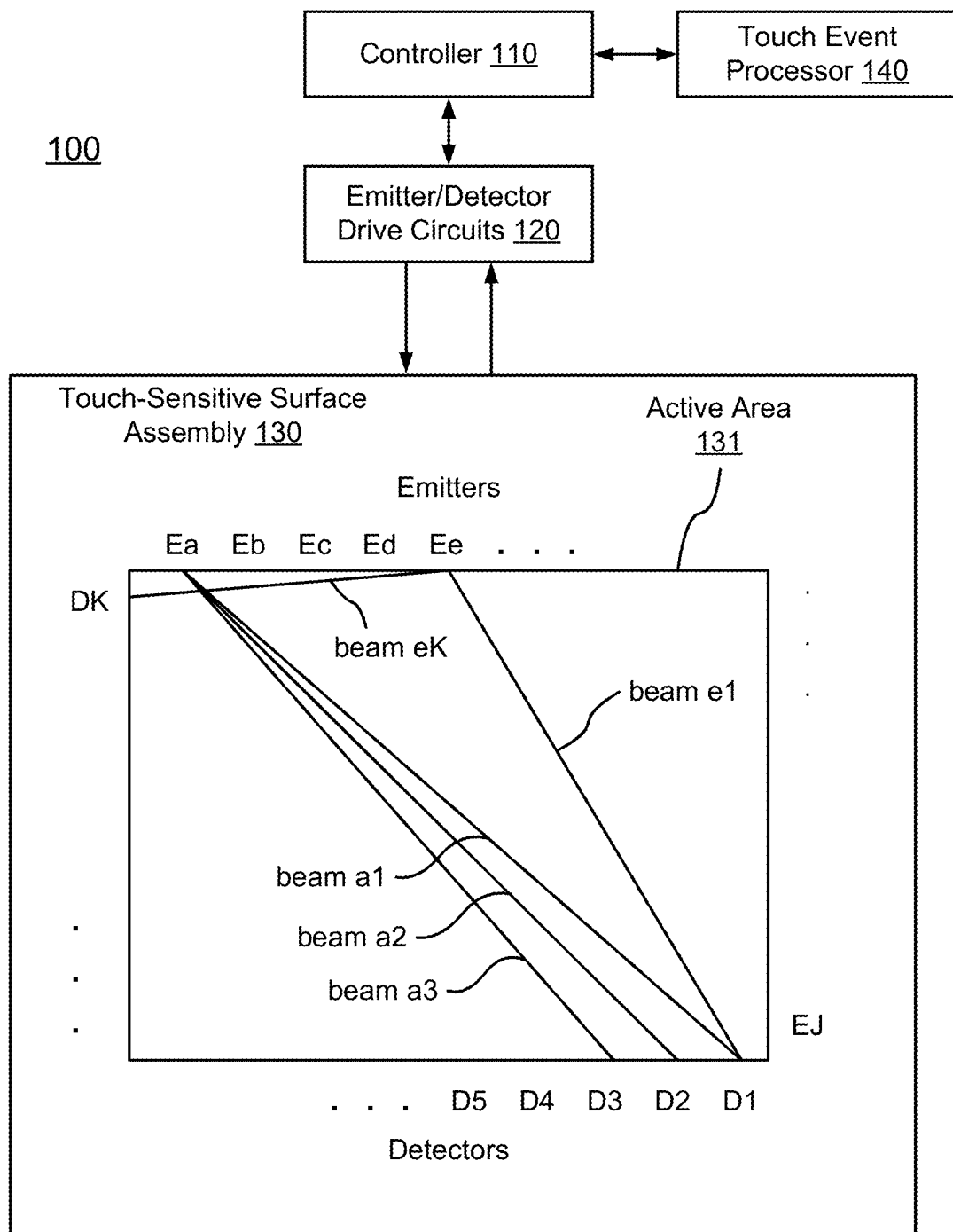
FIG. 1 is a diagram of an optical touch-sensitive device, according to an embodiment.

FIG. 1 is a diagram of an optical touch-sensitive device 100 (also referred to as a touch system, touch-sensitive device, or touch sensor), according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active touch area, touch surface, or active touch surface, even though the surface itself may be an entirely passive structure. The assembly 130 also includes emitters and detectors arranged along the periphery of the active touch surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active touch area 131 will disturb certain beams, thus changing what is received at the detectors Dk. Data about these changes is communicated to the touch event processor 140, which analyzes the data to determine the location(s) (and times) of touch events on surface 131.

The emitters and detectors may be interleaved around the periphery of the sensitive surface. In other embodiments, the number of emitters and detectors are different and are distributed around the periphery in any defined order. The emitters and detectors may be regularly or irregularly spaced. In some cases, the emitters and/or detectors may be located on less than all of the sides (e.g., one side). In some embodiments, the emitters and/or detectors are not located around the periphery (e.g., beams are directed to/from the active touch area 131 by optical beam couplers). Reflectors may also be positioned around the periphery to reflect optical beams, causing the path from the emitter to the detector to pass across the surface more than once.

One advantage of an optical approach as shown in FIG. 1 is that this approach scales well to larger screen sizes compared to conventional touch devices that cover an active touch area with sensors, such as resistive and capacitive sensors. Since the emitters and detectors may be positioned around the periphery, increasing the screen size by a linear factor of N means that the periphery also scales by a factor of N compared to $N^2$ for conventional touch devices.

B. Process Overview

Figure 2:
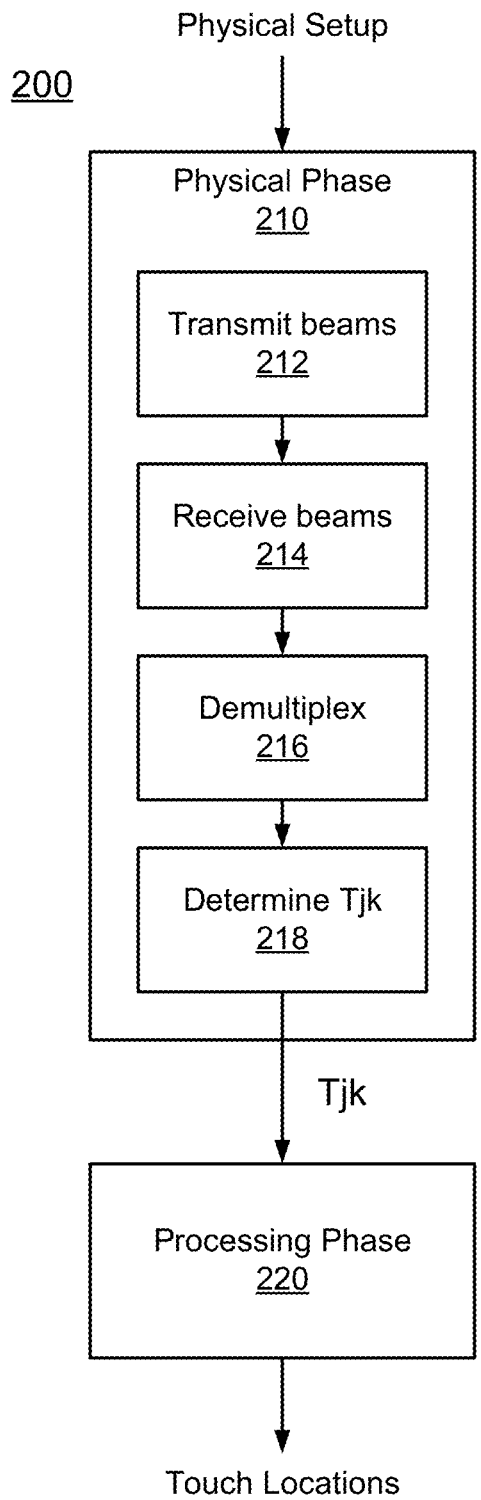
FIG. 2 is a flow diagram for determining the characteristics of touch events, according to an embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk (also referred to as transmission values Tjk).

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location and touch strength) as part of the processing phase 220. Several of these are identified in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient Tjk. Beam attenuation mainly depends on the optical transparency of the object and the volume of the object portion that is interacting with the beam, i.e. the object portion that intersects the beam propagation volume.

Figure 3A:
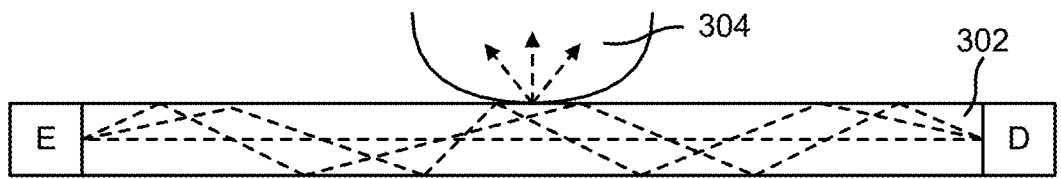
FIG. 3A-3F illustrate example mechanisms for a touch interaction with an optical beam, according to some embodiments.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

The object 304 may disturb the beams if the object 304 is not in direct contact with the surface of the waveguide. If a distance between the object 304 and the surface of the waveguide is less than or equal to the evanescent field of the beams (e.g., 2 micrometers), the object may disturb the beams and the touch system may determine that a touch event occurred.

Figure 3B:

FIG. 3B illustrates a mechanism based on beam blockage (also referred to as an "over the surface" (OTS) configuration). Emitters produce beams which are in close proximity to a surface 306. An object 304 coming into contact with the surface 306 will partially or entirely block beams within the contact area. Since the beams propagate over the surface 306, the object 304 may block the beam even if it is not in direct contact with the surface. FIGS. 3A and 3B illustrate two physical mechanisms for touch interactions, but other mechanisms can also be used. For example, the touch interaction may be based on changes in polarization, scattering, or changes in propagation direction or propagation angle (either vertically or horizontally).

Figure 3C:
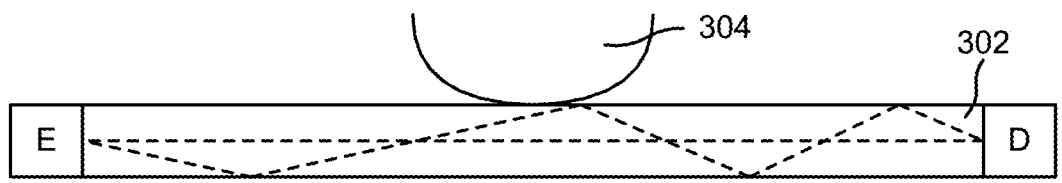

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating, and may also absorb some of the incident light. In FIG. 3C, the optical beam travels at a steeper angle of propagation after the touch 304. Note that changing the angle of the light may also cause it to fall below the critical angle for total internal reflection, whereby it will leave the waveguide. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
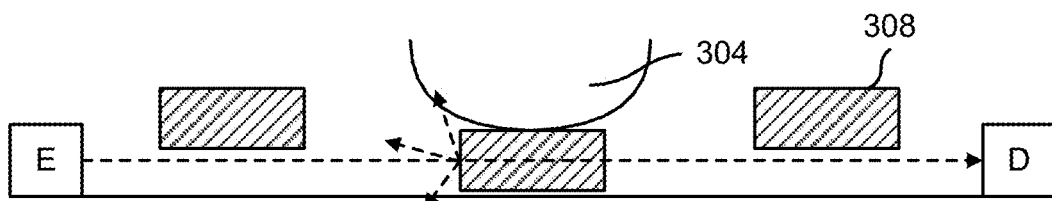

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
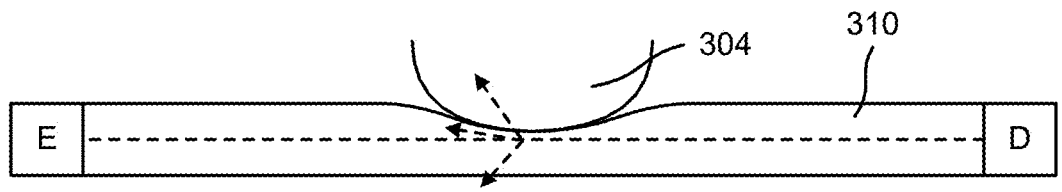

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternatively, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
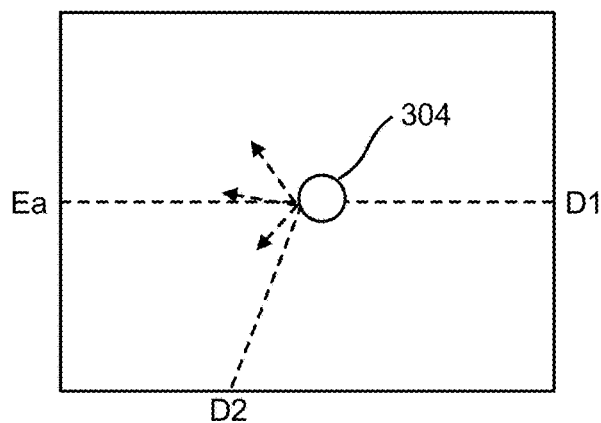

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
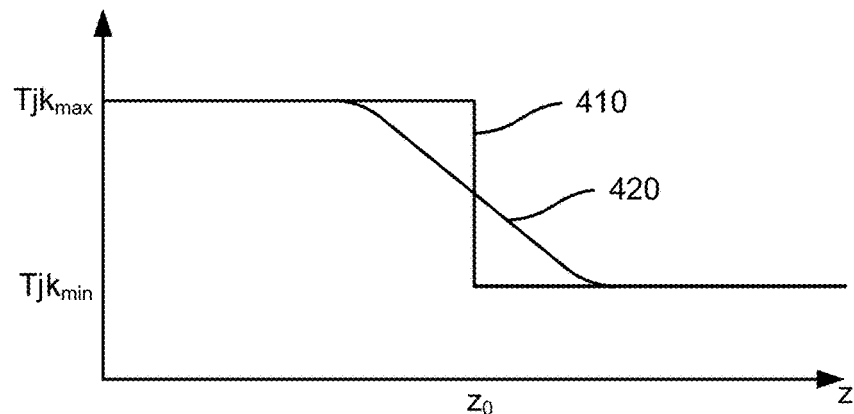
FIG. 4 is a graph of binary and analog touch interactions, according to an embodiment.

FIG. 4 is a graph illustrating a binary touch interaction mechanism compared to an analog touch interaction mechanism. FIG. 4 graphs the transmittance Tjk as a function of the depth z of the touch. The dimension z is into and out of the active touch surface. Curve 410 is a binary response. At low z (i.e., when the touch has not yet disturbed the beam), the transmittance Tjk is at its maximum. However, at some point z0, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Figure 5A:
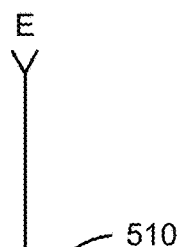
FIGS. 5A-5C are top views of differently shaped beam footprints, according to some embodiments.
Figure 5B:
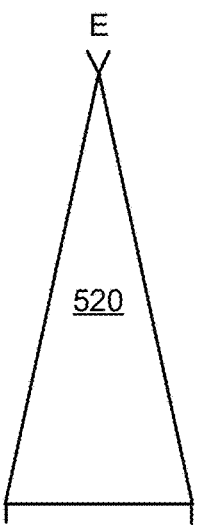
Figure 5C:
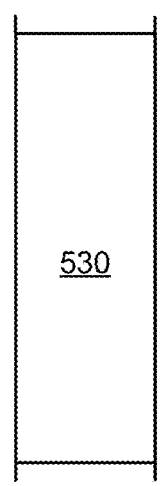

Another aspect of a touch-sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active touch surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide.

Rather, optics (e.g., cylindrical lenses or mirrors) can be used to effectively widen or narrow the lateral extent of the actual sources and sensors.

Figure 6A:
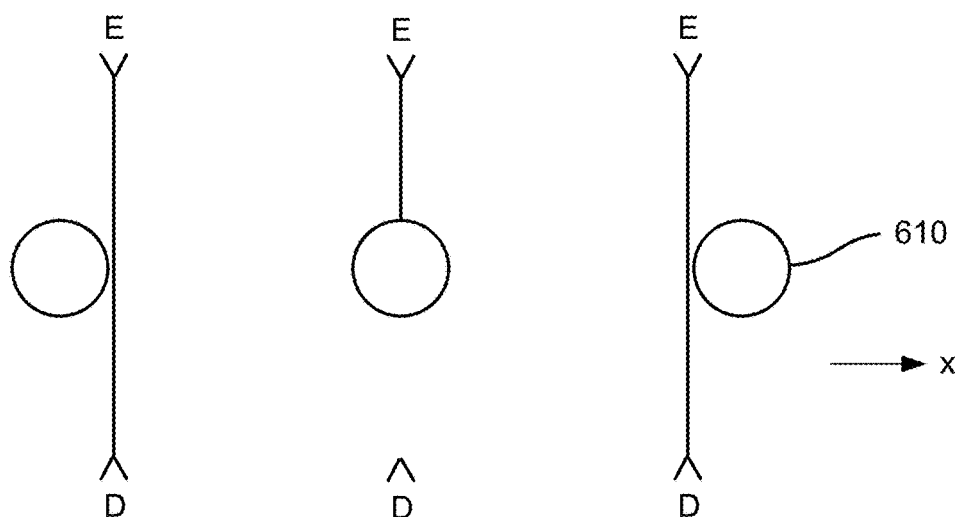
FIGS. 6A-6B are top views illustrating a touch point travelling through a narrow beam and a wide beam, respectively, according to some embodiments.
Figure 6B:
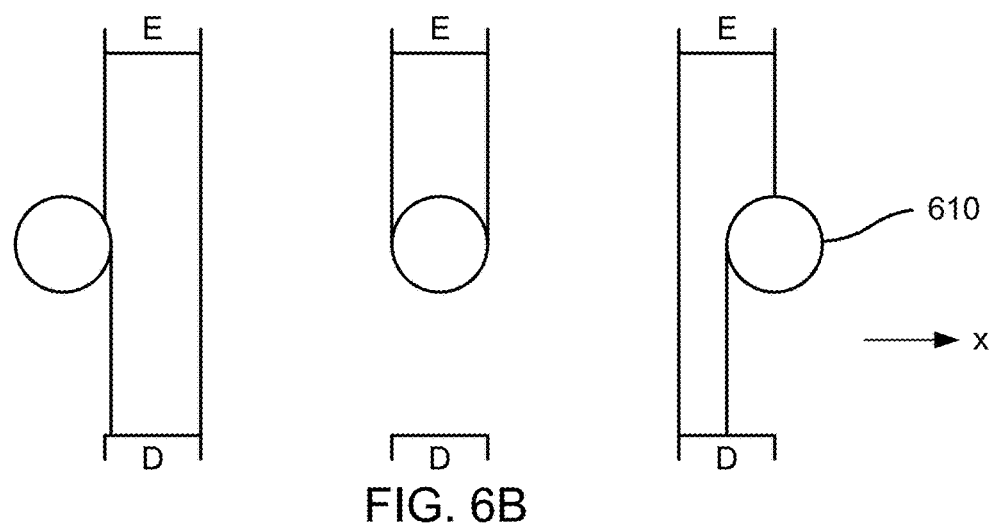
Figure 7:
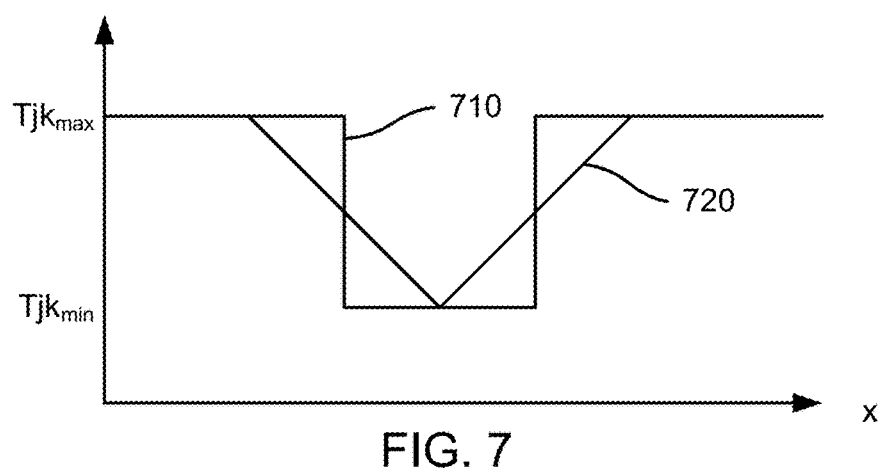
FIG. 7 is a graph of the binary and analog responses for the narrow and wide beams of FIG. 6, according to some embodiments.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Active Area Coverage

Figure 8A:
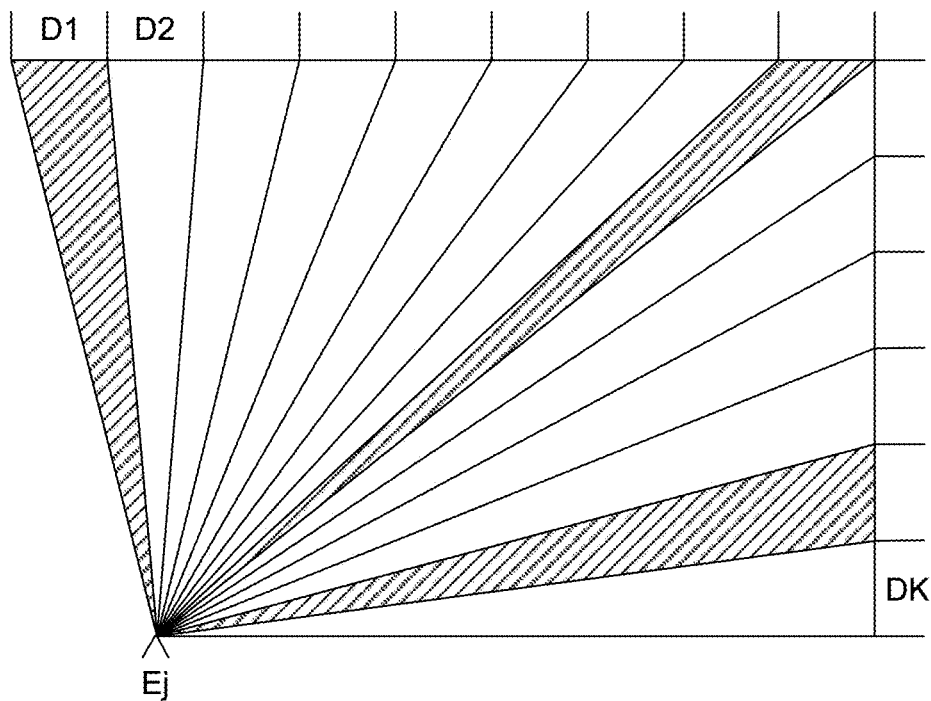
FIGS. 8A and 8B are top views illustrating active touch area coverage by emitters, according to some embodiments.
Figure 8B:
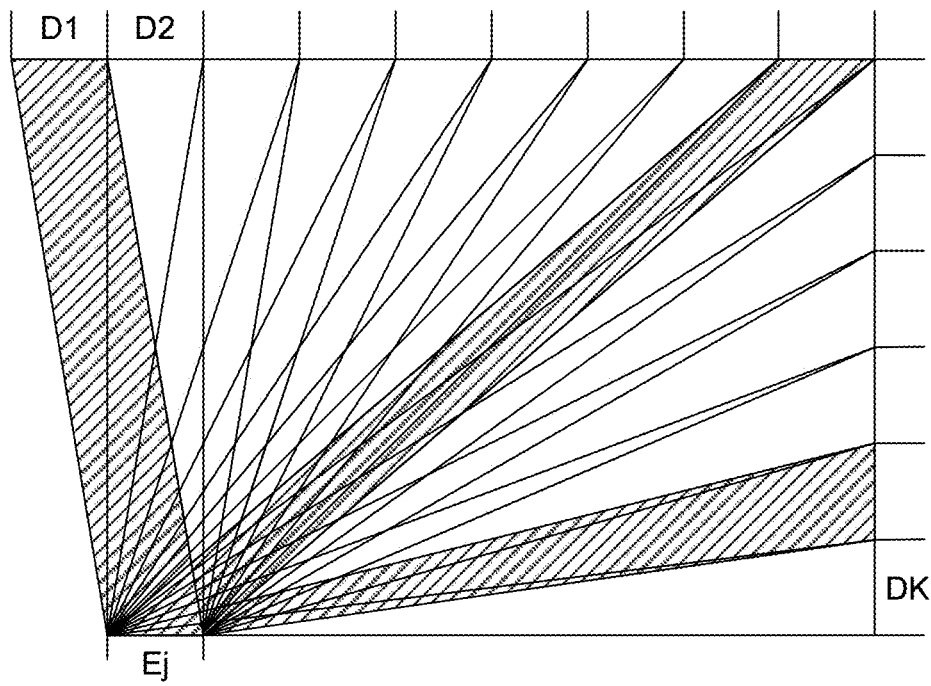

FIG. 8A is a top view illustrating the beam pattern produced by a point emitter. Emitter Ej transmits beams to wide detectors D1-DK. Three beams are shaded for clarity: beam j1, beam j(K-1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but they are referred to as rectangular for convenience). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors), and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active touch area 131. However, not all points within the active touch area 131 will be covered equally. Some points may be traversed by many beam paths while other points traversed by far fewer. The distribution of beam paths over the active touch area 131 may be characterized by calculating how many beam paths traverse different (x,y) points within the active touch area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
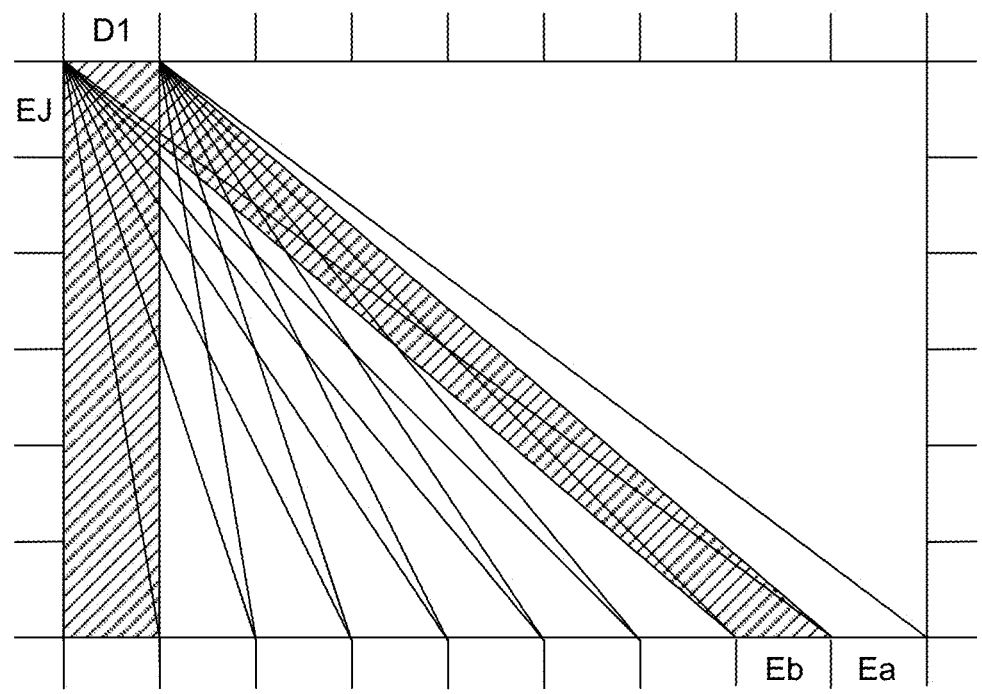
FIGS. 8C and 8D are top views illustrating active touch area coverage by detectors, according to some embodiments.
Figure 8D:
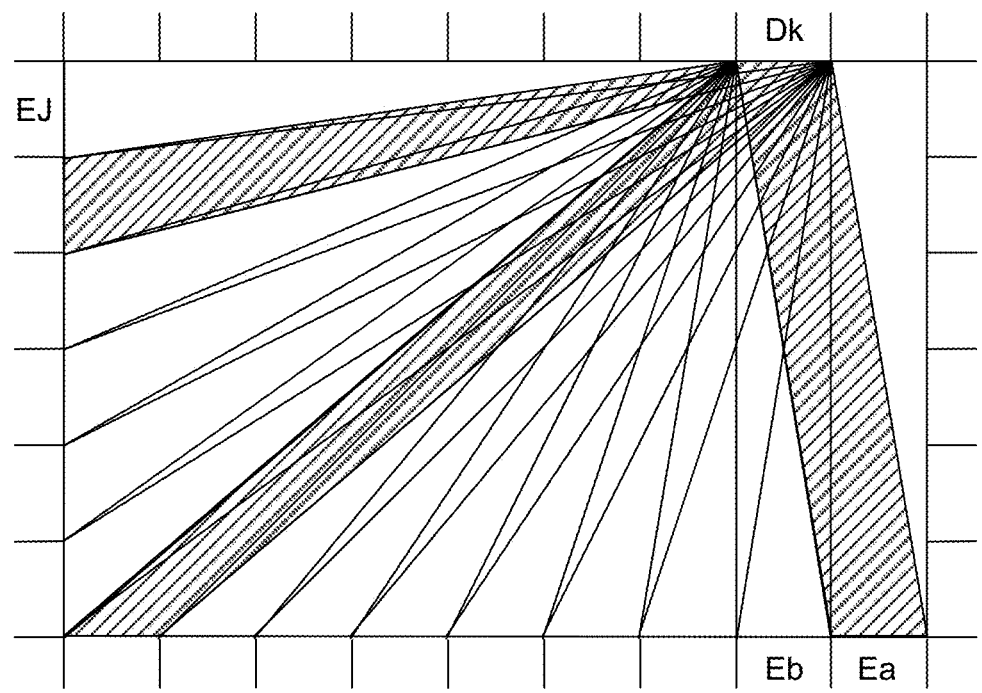

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active touch area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

The coverage of the active touch area 131 depends on the shapes of the beam paths, but also depends on the arrangement of emitters and detectors. In most applications, the active touch area is rectangular in shape, and the emitters and detectors are located along the four edges of the rectangle.

Figure 8E:
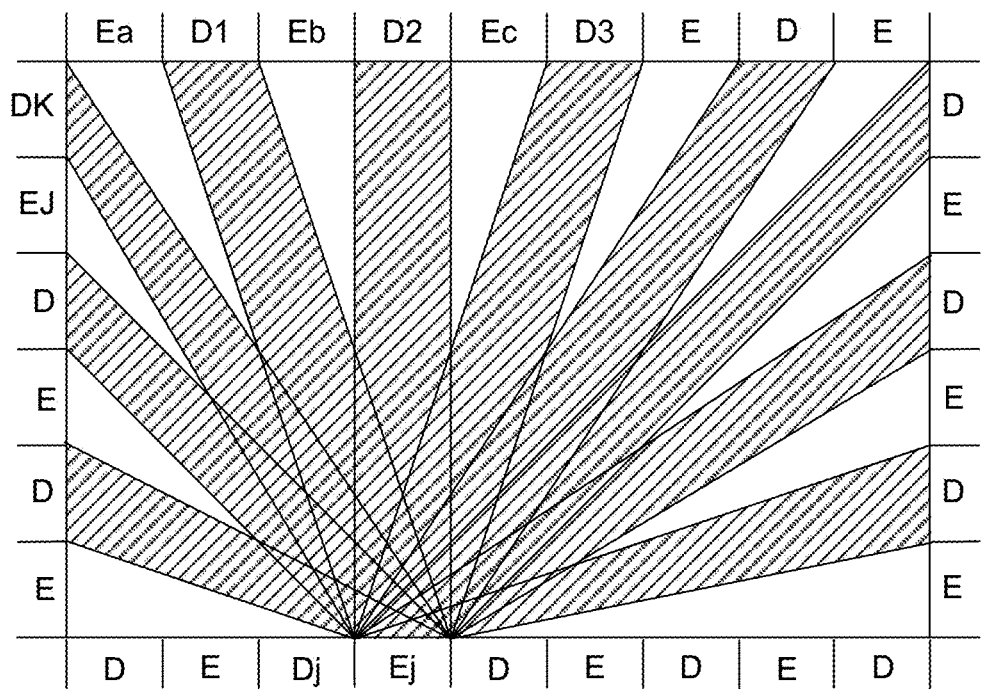
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. Pat. No. 8,350,831, "Method and Apparatus for Detecting a Multitouch Event in an Optical Touch-Sensitive Device," which is incorporated herein by reference.

B. Line Imaging

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location.

FIGS. 9-10 illustrate this concept using the emitter/detector layout shown in FIGS. 8B-8D. For convenience, the term "beam terminal" will be used to refer to emitters and detectors. Thus, the set of beams from a beam terminal (which could be either an emitter or a detector) form a line image of the touch points, where the viewpoint is the beam terminal's location.

Figure 9A:
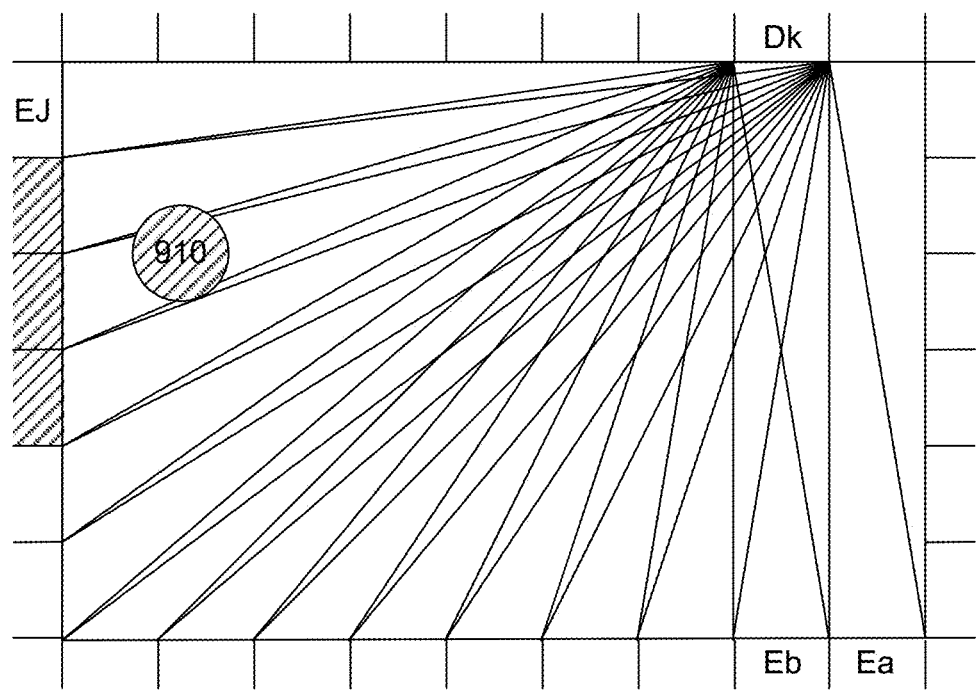
FIGS. 9A-9C are top views illustrating beam patterns interrupted by a touch point, from the viewpoint of different beam terminals, according to some embodiments.
Figure 9B:
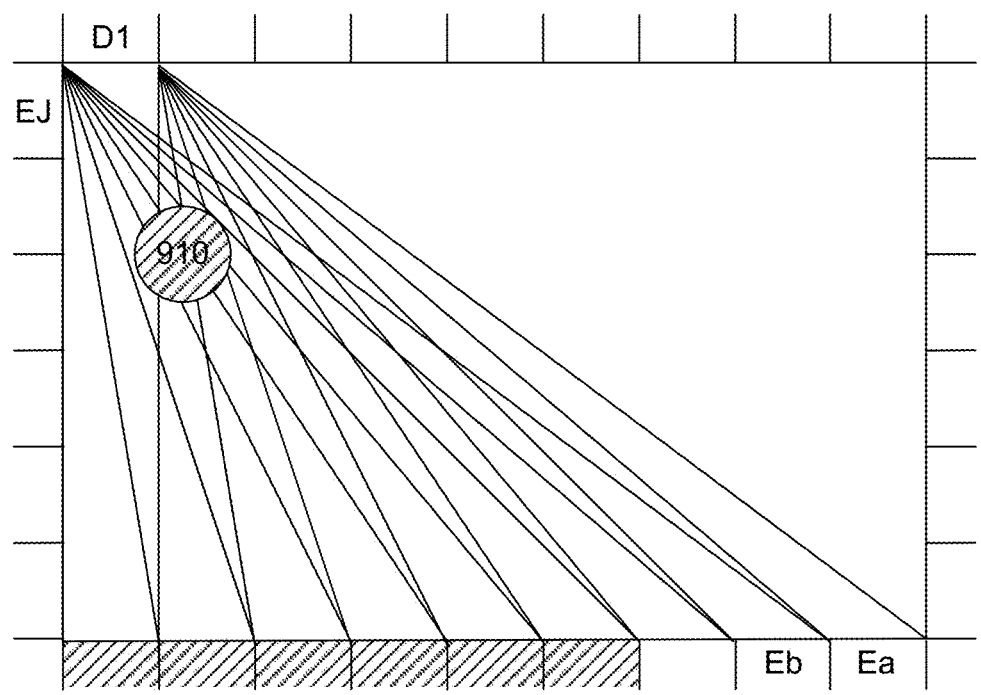
Figure 9C:
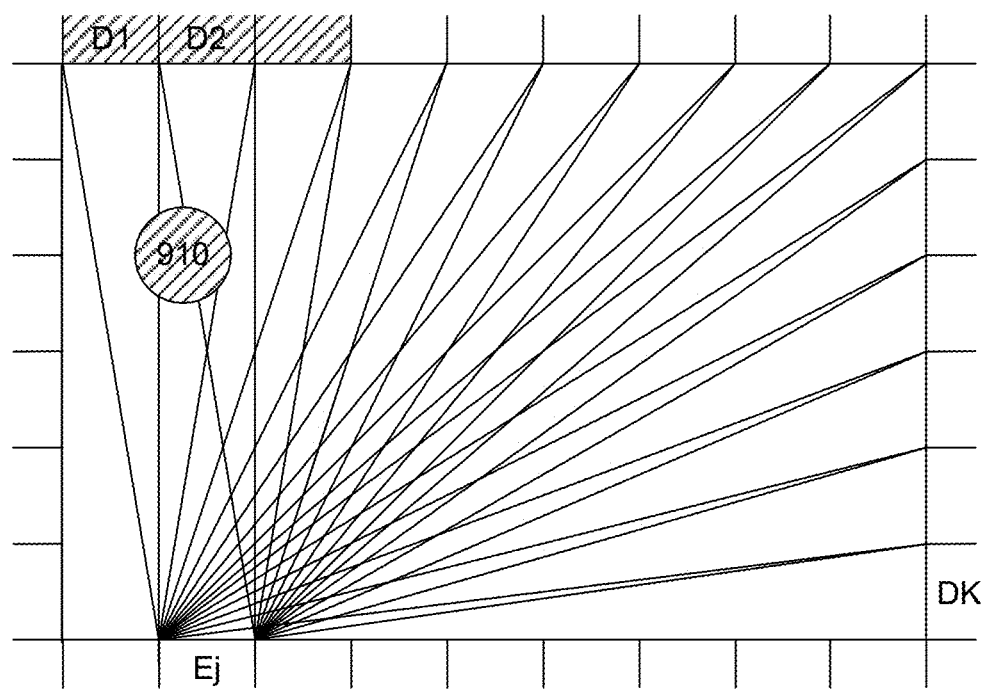
Figure 10A:
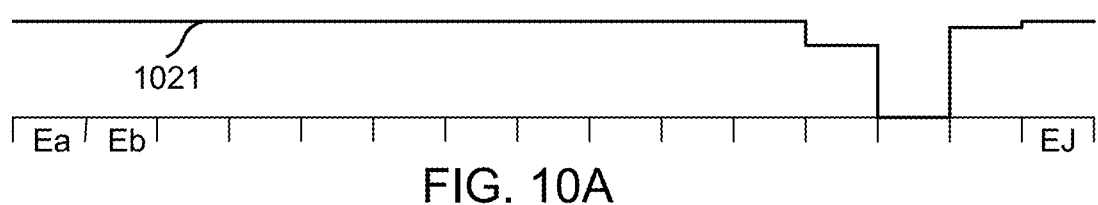
FIGS. 10A-10C are graphs of line images corresponding to the cases shown in FIGS. 9A-9C, according to some embodiments.

FIGS. 9A-C shows the physical set-up of active area, emitters and detectors. In this example, there is a touch point with contact area 910. FIG. 9A shows the beam pattern for beam terminal Dk, which are all the beams from emitters Ej to detector Dk. A shaded emitter indicates that beam is interrupted, at least partially, by the touch point 910. FIG. 10A shows the corresponding line image 1021 "seen" by beam terminal Dk. The beams to terminals Ea, Eb, . . . E(J-4) are uninterrupted so the transmission coefficient is at full value. The touch point appears as an interruption to the beams with beam terminals E(J-3), E(J-2) and E(J-1), with the main blockage for terminal E(J-2). That is, the portion of the line image spanning beam terminals E(J-3) to E(J-1) is a one-dimensional image of the touch event.

Figure 10B:
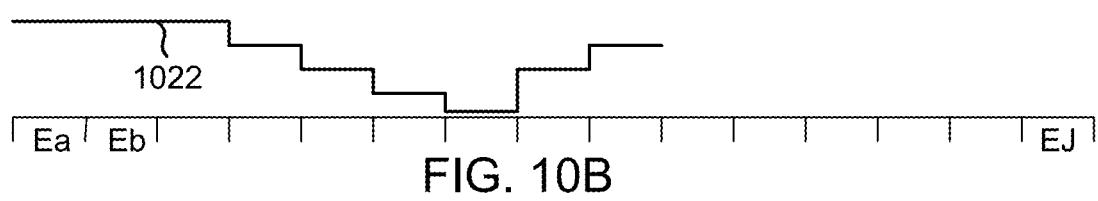
Figure 10C:
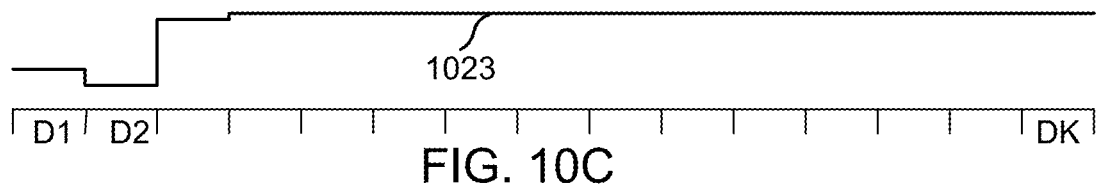

FIG. 9B shows the beam pattern for beam terminal D1 and FIG. 10B shows the corresponding line image 1022 seen by beam terminal D1. Note that the line image does not span all emitters because the emitters on the left edge of the active area do not form beam paths with detector D1. FIGS. 9C and 10C show the beam patterns and corresponding line image 1023 seen by beam terminal Ej.

The example in FIGS. 9-10 use wide beam paths. However, the line image technique may also be used with narrow or fan-shaped beam paths.

FIGS. 10A-C show different images of touch point 910. The location of the touch event can be determined by processing the line images. For example, approaches based on correlation or computerized tomography algorithms can be used to determine the location of the touch event 910. However, simpler approaches are preferred because they require less compute resources.

Figure 9D:
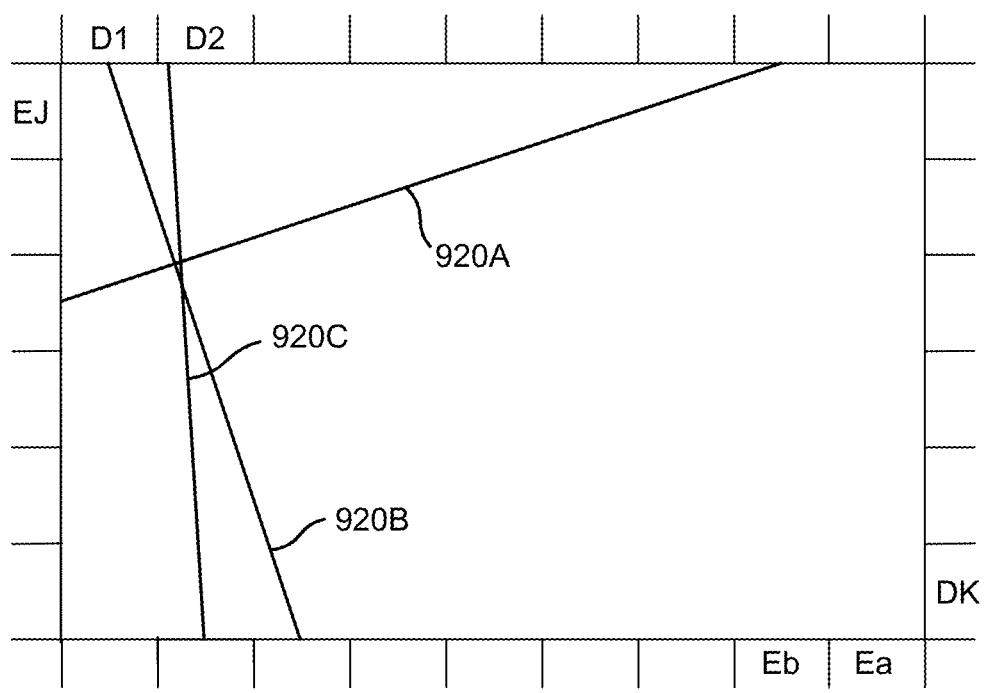
FIG. 9D is a top view illustrating estimation of the touch point, based on the interrupted beams of FIGS. 9A-9C and the line images of FIGS. 10A-10C, according to an embodiment.

The touch point 910 casts a "shadow" in each of the lines images 1021-1023. One approach is based on finding the edges of the shadow in the line image and using the pixel values within the shadow to estimate the center of the shadow. A line can then be drawn from a location representing the beam terminal to the center of the shadow. The touch point is assumed to lie along this line somewhere. That is, the line is a candidate line for positions of the touch point. FIG. 9D shows this. In FIG. 9D, line 920A is the candidate line corresponding to FIGS. 9A and 10A. That is, it is the line from the center of detector Dk to the center of the shadow in line image 1021. Similarly, line 920B is the candidate line corresponding to FIGS. 9B and 10B, and line 920C is the line corresponding to FIGS. 9C and 10C. The resulting candidate lines 920A-C have one end fixed at the location of the beam terminal, with the angle of the candidate line interpolated from the shadow in the line image. The center of the touch event can be estimated by combining the intersections of these candidate lines.

Each line image shown in FIG. 10 was produced using the beam pattern from a single beam terminal to all of the corresponding complimentary beam terminals (i.e., beam pattern from one detector to all corresponding emitters, or from one emitter to all corresponding detectors). As another variation, the line images could be produced by combining information from beam patterns of more than one beam terminal. FIG. 8E shows the beam pattern for emitter Ej. However, the corresponding line image will have gaps because the corresponding detectors do not provide continuous coverage. They are interleaved with emitters. However, the beam pattern for the adjacent detector Dj produces a line image that roughly fills in these gaps. Thus, the two partial line images from emitter Ej and detector Dj can be combined to produce a complete line image.

C. Location Interpolation

Applications typically will require a certain level of accuracy in locating touch points. One approach to increase accuracy is to increase the density of emitters, detectors and beam paths so that a small change in the location of the touch point will interrupt different beams.

Another approach is to interpolate between beams. In the line images of FIGS. 10A-C, the touch point interrupts several beams but the interruption has an analog response due to the beam width. Therefore, although the beam terminals may have a spacing of A, the location of the touch point can be determined with greater accuracy by interpolating based on the analog values. This is also shown in curve 720 of FIG. 7. The measured Tjk can be used to interpolate the x position.

Figure 11A:
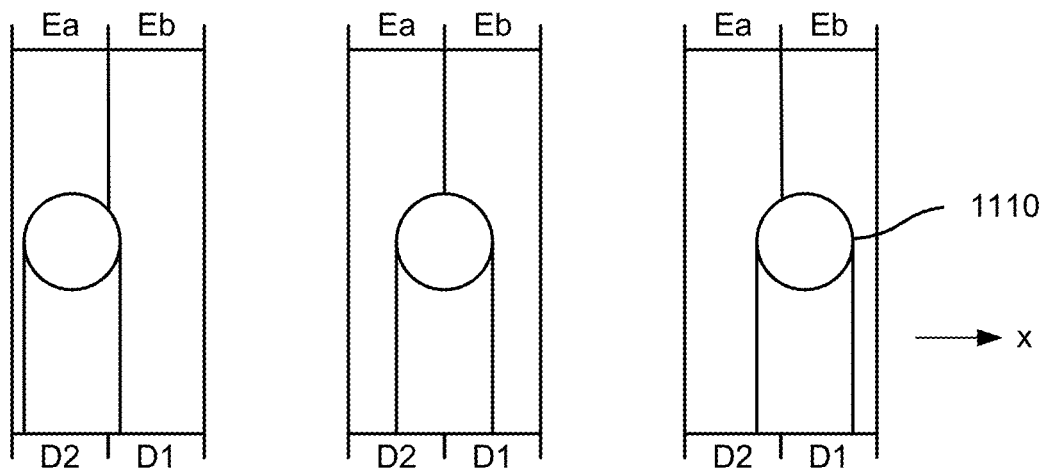
FIG. 11A is a top view illustrating a touch point travelling through two adjacent wide beams, according to an embodiment.
Figure 11B:
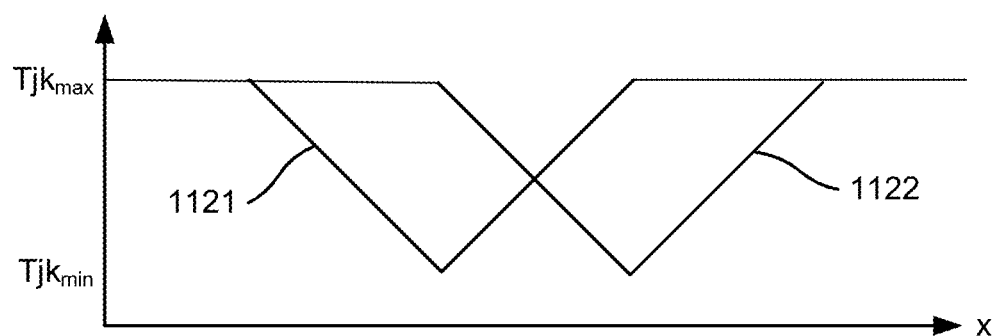
FIG. 11B are graphs of the analog responses for the two wide beams of FIG. 11A, according to some embodiments.

FIGS. 11A-B show one approach based on interpolation between adjacent beam paths. FIG. 11A shows two beam paths a2 and b1. Both of these beam paths are wide and they are adjacent to each other. In all three cases shown in FIG. 11A, the touch point 1110 interrupts both beams. However, in the lefthand scenario, the touch point is mostly interrupting beam a2. In the middle case, both beams are interrupted equally. In the righthand case, the touch point is mostly interrupting beam b1.

FIG. 11B graphs these two transmission coefficients as a function of x. Curve 1121 is for coefficient Ta2 and curve 1122 is for coefficient Tb1. By considering the two transmission coefficients Ta2 and Tb1, the x location of the touch point can be interpolated. For example, the interpolation can be based on the difference or ratio of the two coefficients.

The interpolation accuracy can be enhanced by accounting for any uneven distribution of light across the beams a2 and b1. For example, if the beam cross section is Gaussian, this can be taken into account when making the interpolation. In another variation, if the wide emitters and detectors are themselves composed of several emitting or detecting units, these can be decomposed into the individual elements to determine more accurately the touch location. This may be done as a secondary pass, having first determined that there is touch activity in a given location with a first pass. A wide emitter can be approximated by driving several adjacent emitters simultaneously. A wide detector can be approximated by combining the outputs of several detectors to form a single signal.

Figure 11C:
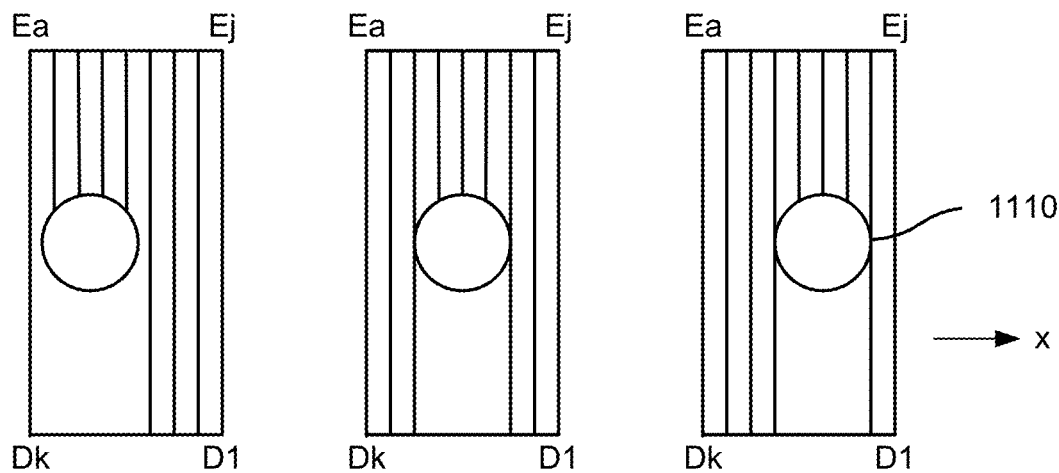
FIG. 11C is a top view illustrating a touch point travelling through many adjacent narrow beams, according to an embodiment.

FIG. 11C shows a situation where a large number of narrow beams is used rather than interpolating a fewer number of wide beams. In this example, each beam is a pencil beam represented by a line in FIG. 11C. As the touch point 1110 moves left to right, it interrupts different beams. Much of the resolution in determining the location of the touch point 1110 is achieved by the fine spacing of the beam terminals. The edge beams may be interpolated to provide an even finer location estimate.

D. Touch Event Templates

If the locations and shapes of the beam paths are known, which is typically the case for systems with fixed emitters, detectors, and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements. Thus, it is desirable to simplify the set of templates.

Figure 12A:
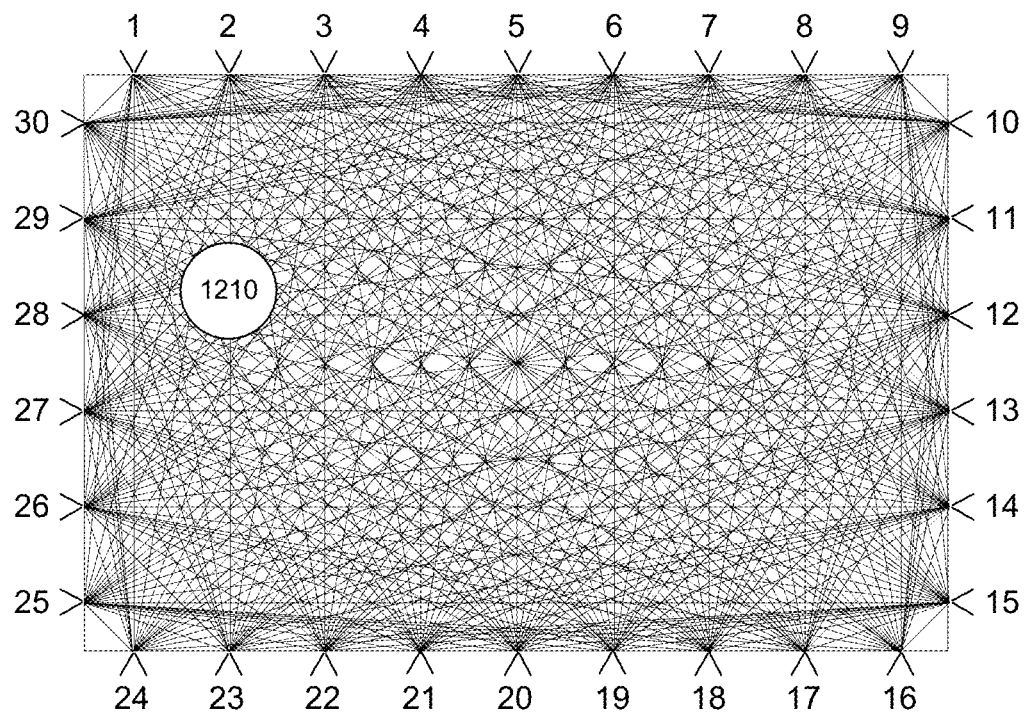
FIGS. 12A-12E are top views of beam paths illustrating templates for touch events, according to some embodiments.

FIG. 12A shows all of the possible pencil beam paths between any two of 30 beam terminals. In this example, beam terminals are not labeled as emitter or detector. Assume that there are sufficient emitters and detectors to realize any of the possible beam paths. One possible template for contact area 1210 is the set of all beam paths that would be affected by the touch. However, this is a large number of beam paths, so template matching will be more difficult. In addition, this template is very specific to contact area 1210. If the contact area changes slightly in size, shape or position, the template for contact area 1210 will no longer match exactly. Also, if additional touches are present elsewhere in the active area, the template will not match the detected data well. Thus, although using all possible beam paths can produce a fairly discriminating template, it can also be computationally intensive to implement.

Figure 12B:
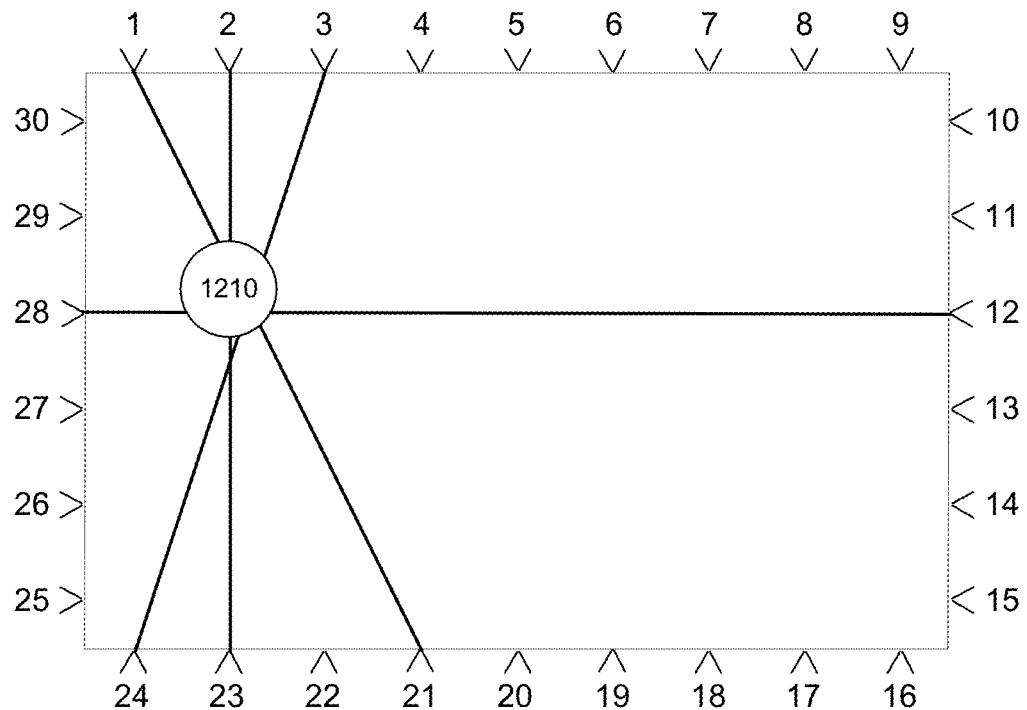

FIG. 12B shows a simpler template based on only four beams that would be interrupted by contact area 1210. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for contact area 1210, increasing in the number of beams contained in the template: a 2-beam template, a 4-beam template, etc. In one embodiment, the beams that are interrupted by contact area 1210 are ordered sequentially from 1 to N. An n-beam template can then be constructed by selecting the first n beams in the order. Generally speaking, beams that are spatially or angularly diverse tend to yield better templates. That is, a template with three beam paths running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Figure 12C:
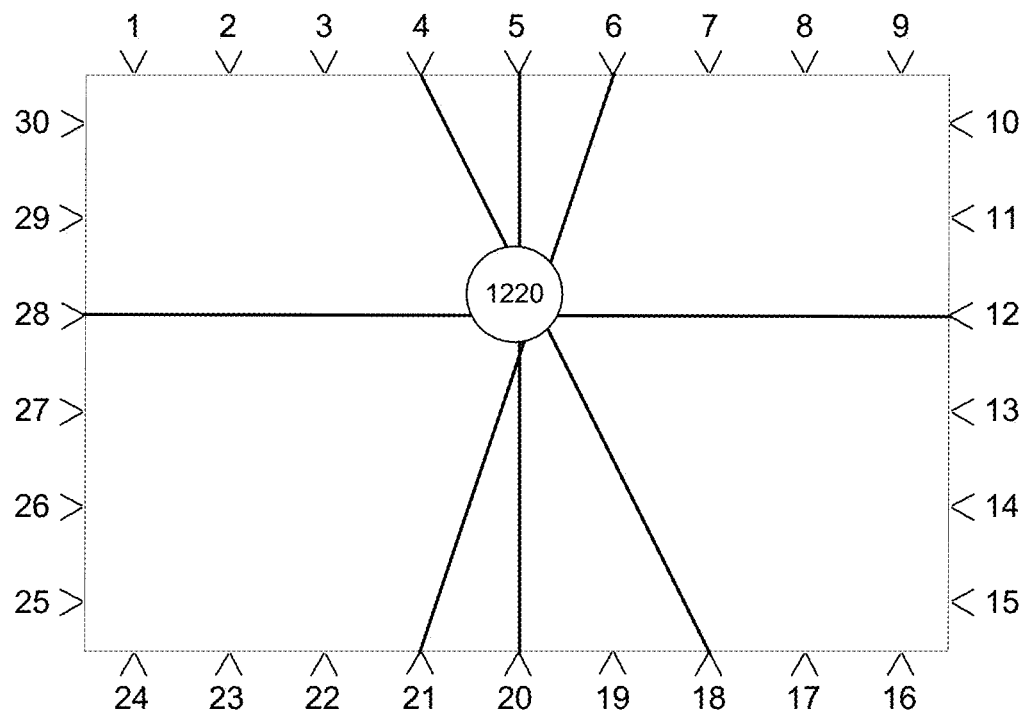

The template in FIG. 12B can also be used to generate a family of similar templates. In FIG. 12C, the contact area 1220 is the same as in FIG. 12B, but shifted to the right. The corresponding four-beam template can be generated by shifting beams (1,21) (2,23) and (3,24) in FIG. 12B to the right to beams (4,18) (5,20) and (6,21), as shown in FIG. 12C. These types of templates can be abstracted. The abstraction will be referred to as a template model. This particular model is defined by the beams (12,28) (i, 22–i) (i+1,24–i) (i+2,25–i) for i=1 to 6. In one approach, the model is used to generate the individual templates and the actual data is matched against each of the individual templates. In another approach, the data is matched against the template model. The matching process then includes determining whether there is a match against the template model and, if so, which value of i produces the match.

Figure 12D:
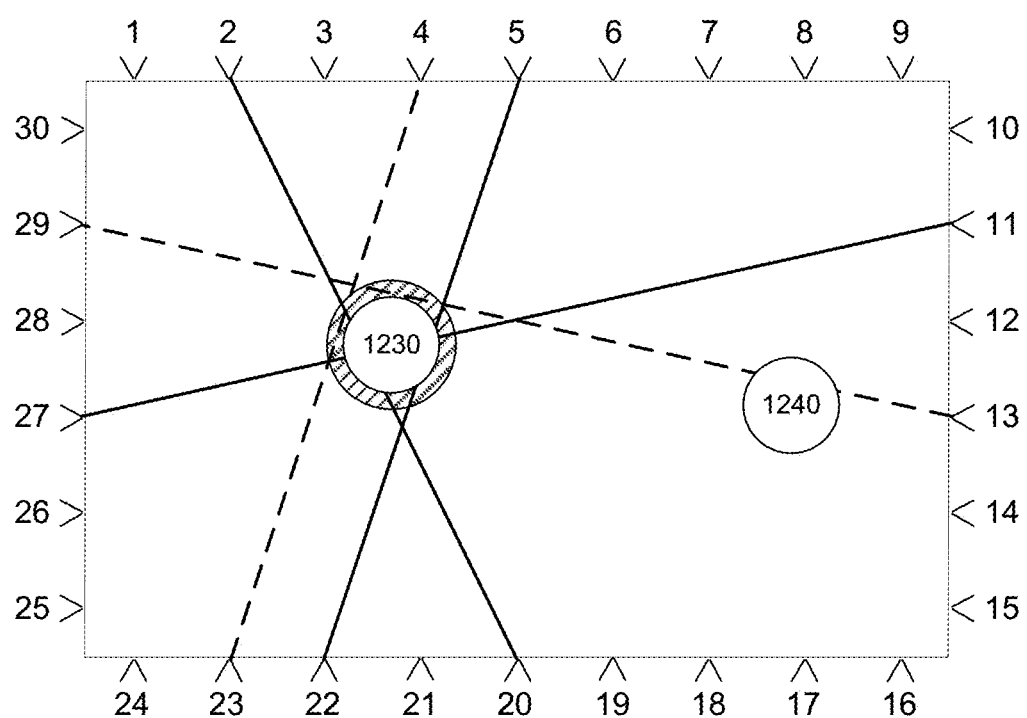

FIG. 12D shows a template that uses a "touch-free" zone around the contact area. The actual contact area is 1230. However, it is assumed that if contact is made in area 1230, then there will be no contact in the immediately surrounding shaded area. Thus, the template includes both (a) beams in the contact area 1230 that are interrupted, and (b) beams in the shaded area that are not interrupted. In FIG. 12D, the solid lines (2,20) (5,22) and (11,27) are interrupted beams in the template and the dashed lines (4,23) and (13,29) are uninterrupted beams in the template. Note that the uninterrupted beams in the template may be interrupted somewhere else by another touch point, so their use should take this into consideration. For example, dashed beam (13,29) could be interrupted by touch point 1240.

Figure 12E:
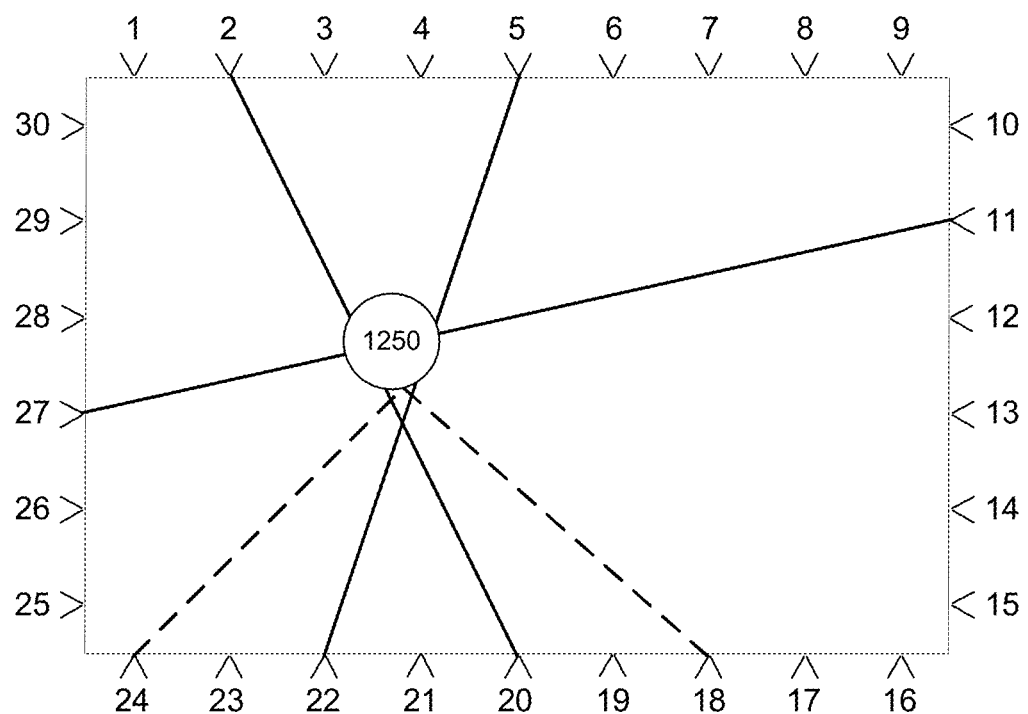

FIG. 12E shows an example template that is based both on reduced and enhanced transmission coefficients. The solid lines (2,20) (5,22) and (11,27) are interrupted beams in the template, meaning that their transmission coefficients should decrease. However, the dashed line (18,24) is a beam for which the transmission coefficient should increase due to reflection or scattering from the touch point 1250.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

In a case where there is a series of N beams, the analysis can begin with a relatively small number of beams. Additional beams can be added to the processing as needed until a certain confidence level (or SNR) is reached. The selection of which beams should be added next could proceed according to a predetermined schedule. Alternately, it could proceed depending on the processing results up to that time. For example, if beams with a certain orientation are giving low confidence results, more beams along that orientation may be added (at the expense of beams along other orientations) in order to increase the overall confidence.

The data records for templates can also include additional details about the template. This information may include, for example, location of the contact area, size and shape of the contact area and the type of touch event being modeled (e.g., fingertip, stylus, etc.).

In addition to intelligent design and selection of templates, symmetries can also be used to reduce the number of templates and/or computational load. Many applications use a rectangular active area with emitters and detectors placed symmetrically with respect to x and y axes. In that case, quadrant symmetry can be used to achieve a factor of four reduction. Templates created for one quadrant can be extended to the other three quadrants by taking advantage of the symmetry. Alternately, data for possible touch points in the other three quadrants can be transformed and then matched against templates from a single quadrant. If the active area is square, then there may be eight-fold symmetry.

Other types of redundancies, such as shift-invariance, can also reduce the number of templates and/or computational load. The template model of FIGS. 12B-C is one example.

In addition, the order of processing templates can also be used to reduce the computational load. There can be substantial similarities between the templates for touches which are nearby. They may have many beams in common, for example. This can be taken advantage of by advancing through the templates in an order that allows one to take advantage of the processing of the previous templates.

E. Multi-Pass Processing

Referring to FIG. 2, the processing phase need not be a single-pass process nor is it limited to a single technique. Multiple processing techniques may be combined or otherwise used together to determine the locations of touch events.

Figure 13:
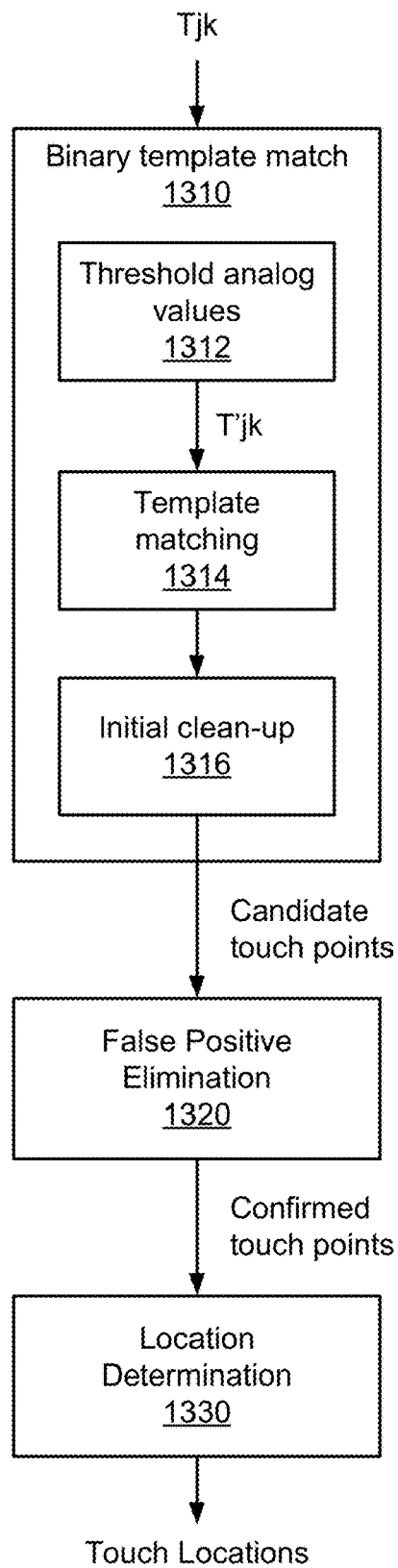
FIG. 13 is a flow diagram of a multi-pass method for determining touch locations, according to some embodiments.

FIG. 13 is a flow diagram of a multi-pass processing phase based on several stages. This example uses the physical set-up shown in FIG. 9, where wide beams are transmitted from emitters to detectors. The transmission coefficients Tjk are analog values, ranging from 0 (fully blocked) to 1 (fully unblocked).

The first stage 1310 is a coarse pass that relies on a fast binary template matching, as described with respect to FIGS. 12B-D. In this stage, the templates are binary and the transmittances T'jk are also assumed to be binary. The binary transmittances T'jk can be generated from the analog values Tjk by rounding or thresholding 1312 the analog values. The binary values T'jk are matched 1314 against binary templates to produce a preliminary list of candidate touch points. Thresholding transmittance values may be problematic if some types of touches do not generate any beams over the threshold value. An alternative is to threshold the combination (by summation for example) of individual transmittance values.

Some simple clean-up 1316 is performed to refine this list. For example, it may be simple to eliminate redundant candidate touch points or to combine candidate touch points that are close or similar to each other. For example, the binary transmittances T'jk might match the template for a 5 mm diameter touch at location (x,y), a 7 mm diameter touch at (x,y) and a 9 mm diameter touch at (x,y). These may be consolidated into a single candidate touch point at location (x,y).

Stage 1320 is used to eliminate false positives, using a more refined approach. For each candidate touch point, neighboring beams may be used to validate or eliminate the candidate as an actual touch point. The techniques described in U.S. Pat. No. 8,350,831 may be used for this purpose. This stage may also use the analog values Tjk, in addition to accounting for the actual width of the optical beams. The output of stage 1320 is a list of confirmed touch points.

The final stage 1330 refines the location of each touch point. For example, the interpolation techniques described previously can be used to determine the locations with better accuracy. Since the approximate location is already known, stage 1330 may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower nominal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

These weightings can be used in a number of different ways. In one approach, whether a candidate touch point is an actual touch event is determined based on combining the transmission coefficients for the beams (or a subset of the beams) that would be disturbed by the candidate touch point. The transmission coefficients can be combined in different ways: summing, averaging, taking median/percentile values or taking the root mean square, for example. The weightings can be included as part of this process: taking a weighted average rather than an unweighted average, for example. Combining multiple beams that overlap with a common contact area can result in a higher signal to noise ratio and/or a greater confidence decision. The combining can also be performed incrementally or iteratively, increasing the number of beams combined as necessary to achieve higher SNR, higher confidence decision and/or to otherwise reduce ambiguities in the determination of touch events.

IV. Waveguide-Based Image Capture

Introduction

Many touch sensors for use on their own or with displays respond to touches which are in contact with or close to the touch surface. The ability to detect imminent touch activity at a greater distance from the surface, or to follow actions which never contact the surface (such as hand-waving gestures) can simplify and enhance the operability of a device.

This extended sensing is often performed using cameras. Ideally, the camera would have the viewpoint of being directly below the touch surface, but when used with a display, that is where the display is generally located. It would be advantageous to be able to synthesize a camera viewpoint which is located in front of the display. However, integrating cameras into displays is complex and expensive.

Other typical functions of a camera associated with a display, such as eye-tracking and video calling, may also be enhanced by this face-on camera viewpoint.

Disclosure

An imaging optical system which may not be visible to the user can be introduced between the display and the user without materially impairing the displayed image quality. The imaging optical system directs light from the external scene to be captured (for example hands approaching the surface) into a waveguide which can be substantially planar and can extend over the majority of or the entire display area. The waveguide may or may not be a waveguide of the optical touch-sensitive device 100 previously described. Once inside the waveguide, the external scene light is directed to an imaging device (also referred to as an imager), such as a camera, at a location which is convenient to the mechanical construction of the device.

Figure 14:
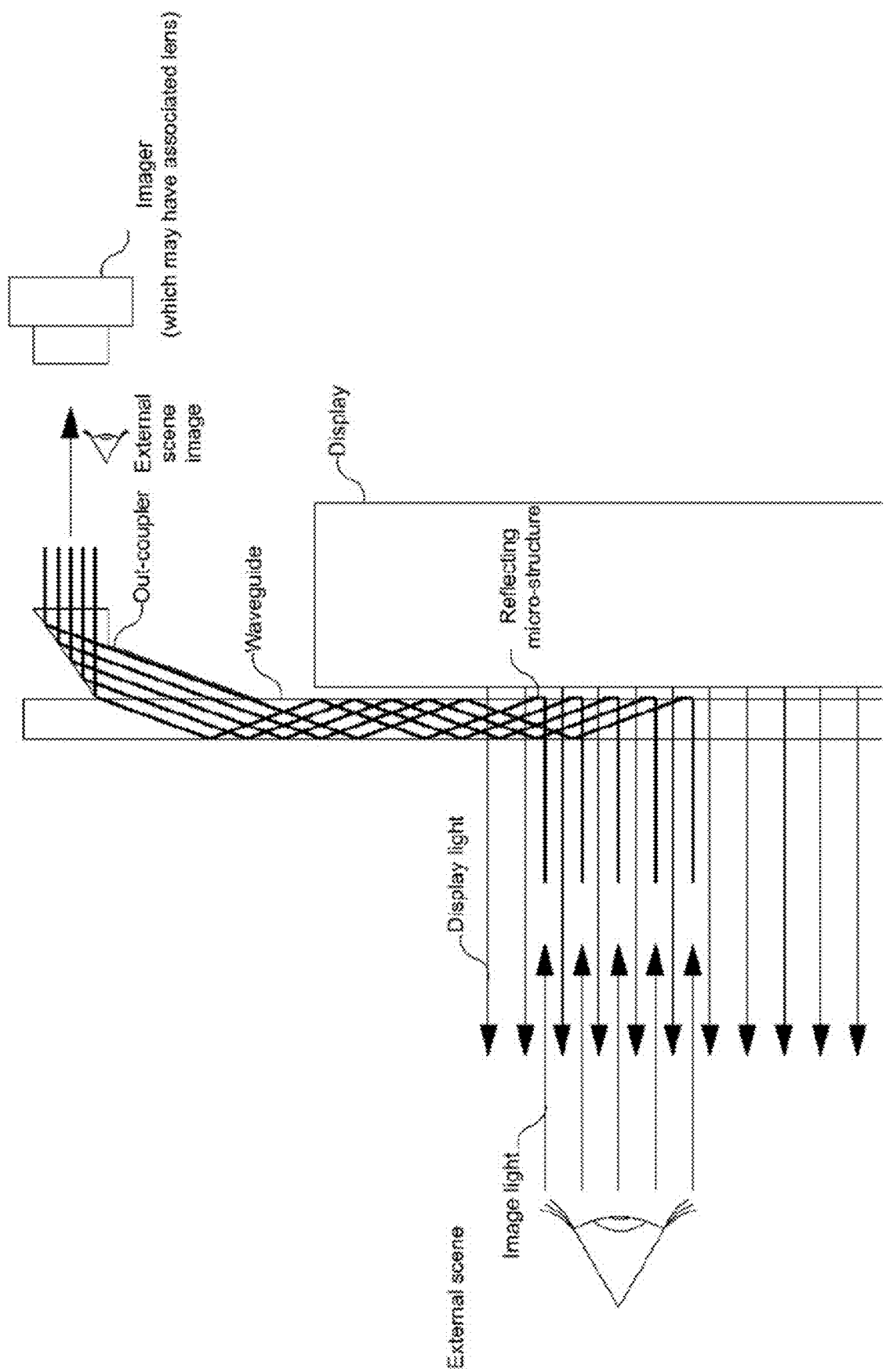
FIG. 14 illustrates an imaging optical system, according to an embodiment.

FIG. 14 shows an example configuration of this imaging optical system. In the embodiment shown, the imaging optical system is composed of a population of optical micro-structures which can be smaller than the pixels in the display so that the display quality is maintained. The structures can optionally be arranged at a spacing which is not related to the spacing of pixels in the display matrix so that Moire fringing and other artifacts are avoided. One example of this is a randomized 'dithering' offset applied to the X and Y location ordinates for each microstructure.

In one embodiment, reflective micro-structures are located on the display side of a transparent waveguide through which the user views the display. These micro-structures can be protruding from the waveguide surface or recessed into it. Recesses can be advantageous because of their small size. A micro-reflector can consist of an inclined surface which redirects light incident on the user-side of the waveguide into the waveguide by TIR (total internal reflection). In order to sustain TIR, the reflecting surface should have a boundary with a substance of lower refractive index (relative to the material from which the reflector is fabricated). This can be air, though a waveguide generally benefits from mechanical support by being bonded to the display, with no air gap. In this case, a low refractive index coating can be applied to the display side of the waveguide to facilitate the reflector action and the subsequent reflections off the waveguide surface.

Figure 15:
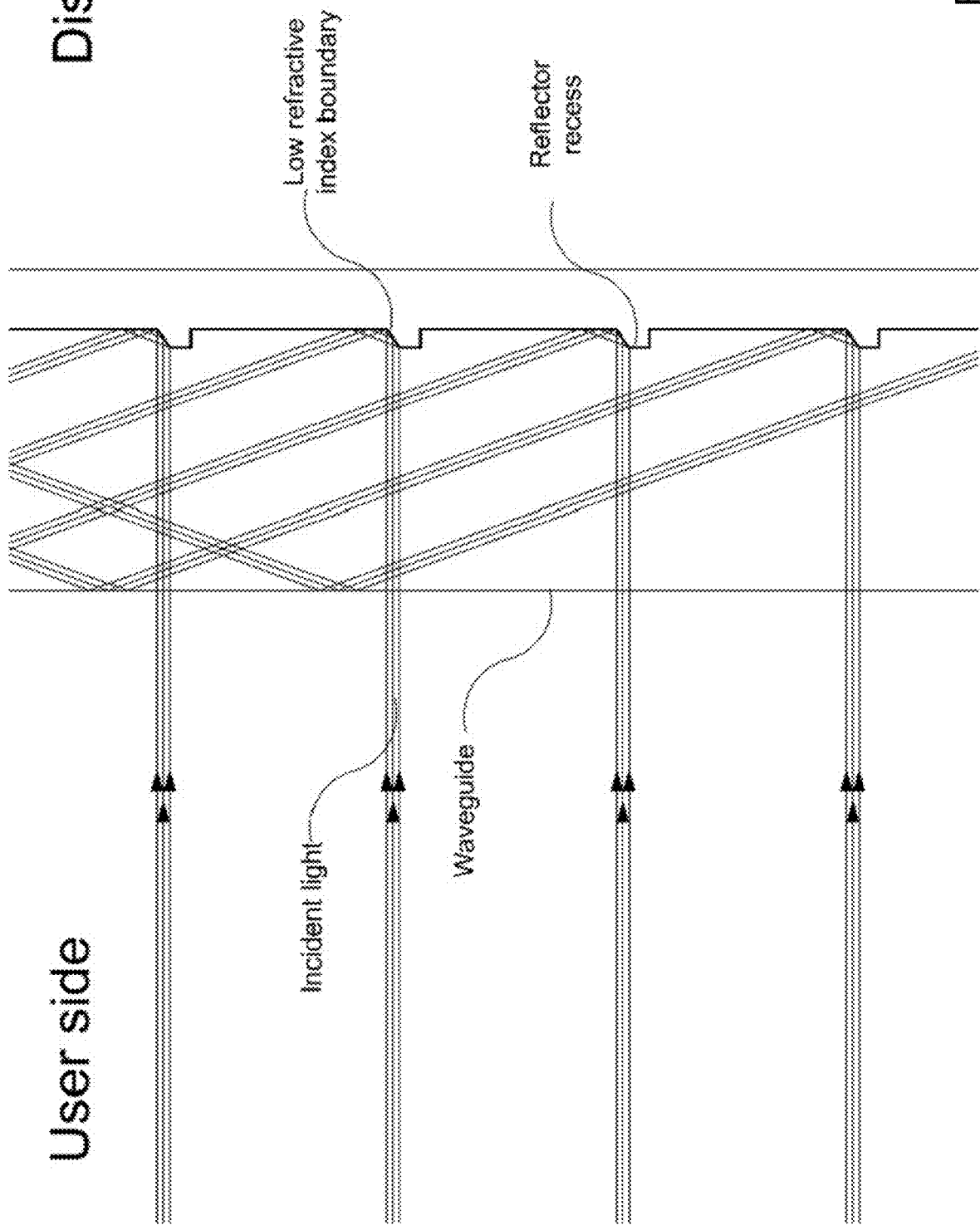
FIG. 15 illustrates the operation of recessed TIR reflectors, according to an embodiment.

FIG. 15 illustrates the operation of recessed TIR reflectors, according to an embodiment.

Figure 16:
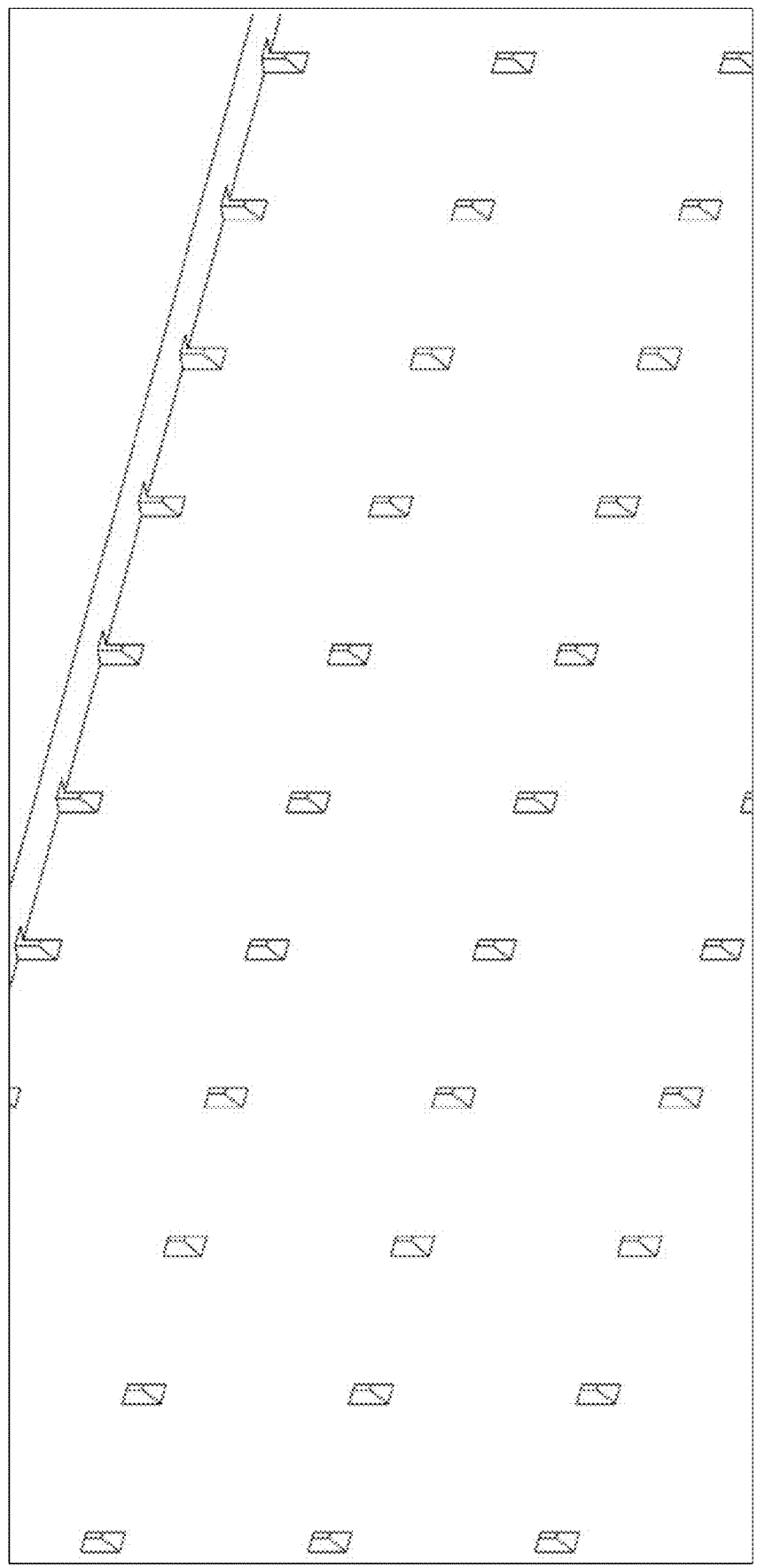
FIG. 16 is an illustration of recessed reflectors arranged in a two-dimensional array on the display side of a waveguide, according to an embodiment.

FIG. 16 is an illustration of recessed reflectors arranged in a two-dimensional array on the display side of a waveguide, according to an embodiment.

Figure 17:
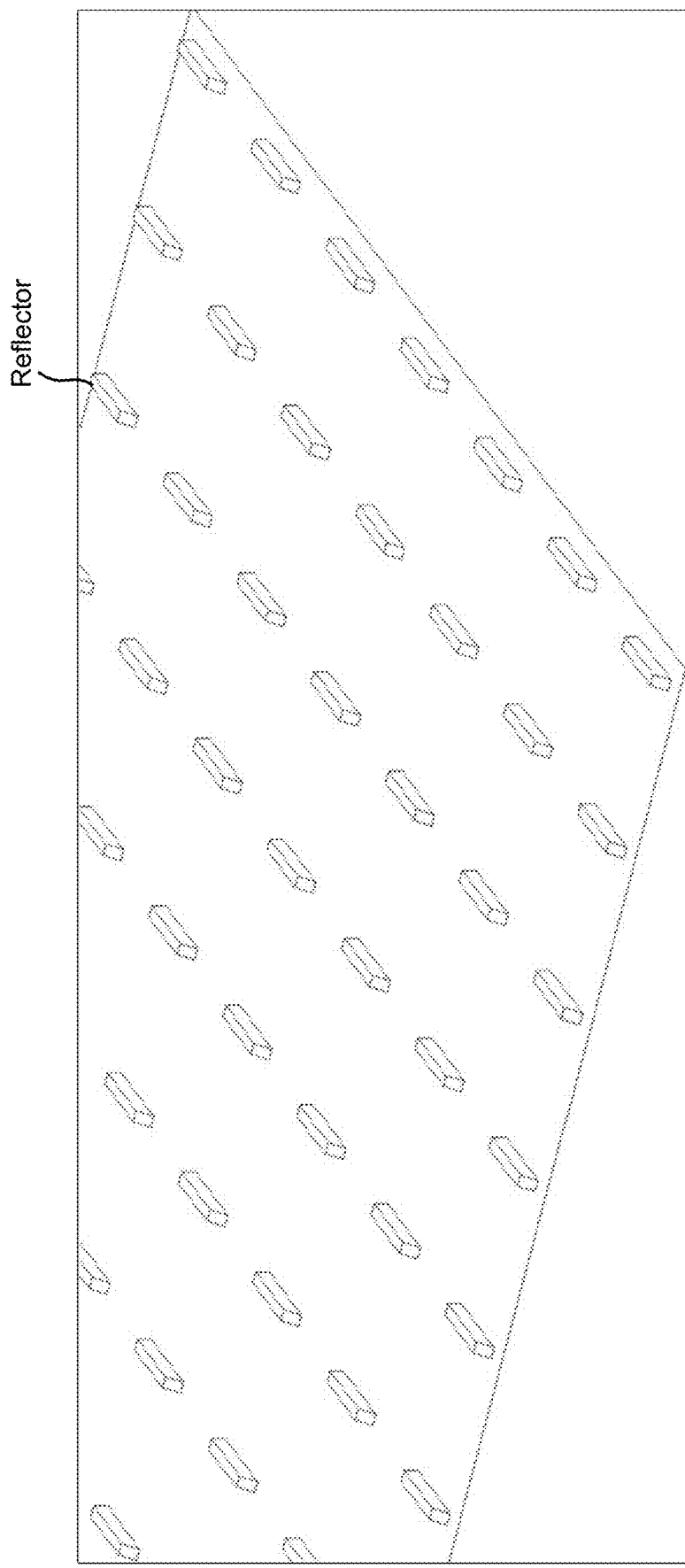
FIG. 17 shows protruding reflectors including reflecting surfaces and a channels into which the light is reflected into the waveguide, according to an embodiment.

FIG. 17 shows protruding reflectors including reflecting surfaces and channels into which the light is reflected into the waveguide, according to an embodiment.

In another embodiment, optical micro-structures are also or alternatively present on the touch side of the waveguide. For example, lenses (on the touch side) opposing the reflectors (on the display side) can be used to increase the amount of light incident on the reflectors. Micro-structures capable of refracting incident external scene image light to an angle compatible with propagation by TIR inside the waveguide can be used on the touch side of the waveguide without the need for reflectors on the display side (though the angle of TIR propagation relative to the waveguide is generally quite high in this construction, which means more reflections off the waveguide surfaces for a given waveguide thickness and span). Two-stage coupling into the waveguide, such as refractive elements on the touch side and reflectors on the display side, can also be implemented.

Where reflectors are used, they can be metallized, but this may not be challenging or impractical to do on such a small scale and over a large area. Furthermore, it is typically expensive. Thus, total internal reflection is generally preferred. For example, a TIR reflector may be implemented using a polymer with a refractive index of 1.50 and a coating with a refractive index of 1.18.

Since the surface area of a single optical micro-structure is relatively small, the amount of light incident upon it is also small. In order to achieve an adequate signal-to-noise ratio at the imaging device, it is preferable to use numerous micro-structures arrayed on the waveguide, potentially more than one per pixel on the imager. Also, the micro-structures can be orientated (e.g., rotated about the normal axis to the surface) to direct light from a large span of micro-structures to a smaller region, such as the imager. The angle of the reflecting surface can also be varied throughout the array to concentrate the external scene image in the orthogonal axis. Having a relatively sparse distribution of micro-structures allows the light-gathering area to be relatively large without causing perceptible disruption to the display images seen by the user through the imaging optical system.

Figure 18:
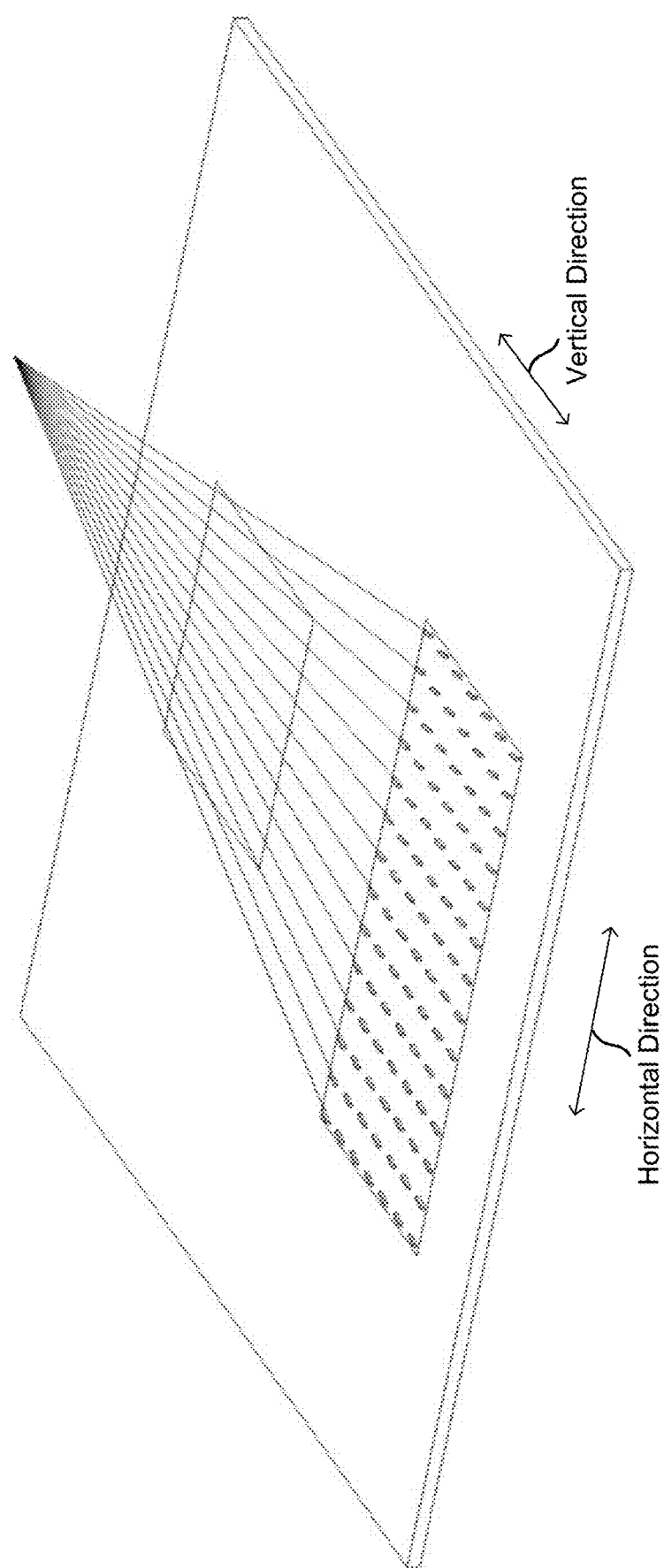
FIG. 18 shows the orientation of protruding reflective structures to reduce the horizontal span of the external scene image, according to an embodiment.

FIG. 18 shows the orientation of some protruding reflective structures to reduce the horizontal span of the external scene image, according to an embodiment. The vertical dimension may be unaffected in this case, but can be adjusted by changing the reflector angles to give different elevation angles for the light within the waveguide (elevation angle is the angle of light propagating via TIR in relative to the touch side surface (or the display side surface) of the waveguide). Although 'horizontal' is mentioned and illustrated, this could be done for any axis.

In an example design, a recessed reflecting surface on the display side of the waveguide is 20 micrometers (um)×20 um as viewed by a user in front. A 55" display with a '4 k' resolution of 3840×2160 pixels has a pixel size of approximately 317 um×317 um. In this example, one reflector occupies an area which is about ½50th of the size of a display pixel. This generally does not have any noticeable effect on the display image. The reflector size may be increased or more reflectors may be placed within the area of a single display pixel to capture more light.

Micro-structures like this can be economically replicated in large quantities and over large areas by processes such as UV nanolithography. Origination methods for micro-structures include greyscale laser writing, two-photon polymerization, and diamond-turning. Micro-structures can have a height of between 200 nanometers and 100 micrometers for displays with pixel sizes in the range of 50 um×50 um to 500 um×500 um. Larger pixel sizes will typically allow for taller micro-structures since the structure height is related to the projected area of the reflecting surfaces, which can be larger if the pixel area is increased (e.g., as along as the micro-structures do not cause excessive disturbances to the displayed image quality).

It is not always possible to ensure a specific relationship between the light directed into the waveguide from a given area to a remotely located imaging device, particularly if the distance travelled in the waveguide is large (consistent with many reflections—for example, more than 10 reflections) and/or the flatness of the waveguide surfaces is not well controlled. So, the imaging device may not be presented with a direct external scene image from the viewpoint of the waveguide, but rather a complex pattern of light which is the external scene image convolved with the point-spread function of the micro-structures and waveguide and any other optical elements in the imaging optical system. In order to resolve a usable external scene image, a deconvolution process can be performed on the output of the imaging device. This may be a calculation performed in software on an associated processing device, but it may alternatively be performed in hardware, or some combination of the two.

The point-spread function of the imaging optical system can be determined by presenting known images to the waveguide such that the convolution inherent in the imaging optical system is revealed. This can readily be done by presenting a very small light source (for example, a light source behind a pinhole aperture), and moving it to explore the entire visual field of the waveguide. With a light source (e.g., aperture size) which is smaller than the finest resolution to be resolved, this procedure directly reveals the point-spread function of the imaging optical system which can then be used to deconvolve any arbitrary image.

Assuming an imager which is located above the display as seen by the user, the micro-structure system can be restricted in the image span (usually image height if the external scene image is propagating vertically in the waveguide) of the external scene image captured. This is because of the potentially short distance between reflections as the external scene image light propagates by TIR within the waveguide. For example, a waveguide of 1 mm thickness (t) with a light elevation angle of 15 degrees in the waveguide would have a distance between reflections of 2t/tan(15)=7.46 mm (millimeters). Thus, an image span of greater than 7.46 mm results in an overlap between one area of the image and another. Also, an imager with a physical extent of less than 7.46 mm in the relevant direction could result in an incomplete image being acquired. The full image can be resolved onto an imaging system with a dimension less than the image span by adopting an anamorphic optical design, where the angles of the reflective surfaces direct the external scene image light into a small vertical dimension.

Figure 19:
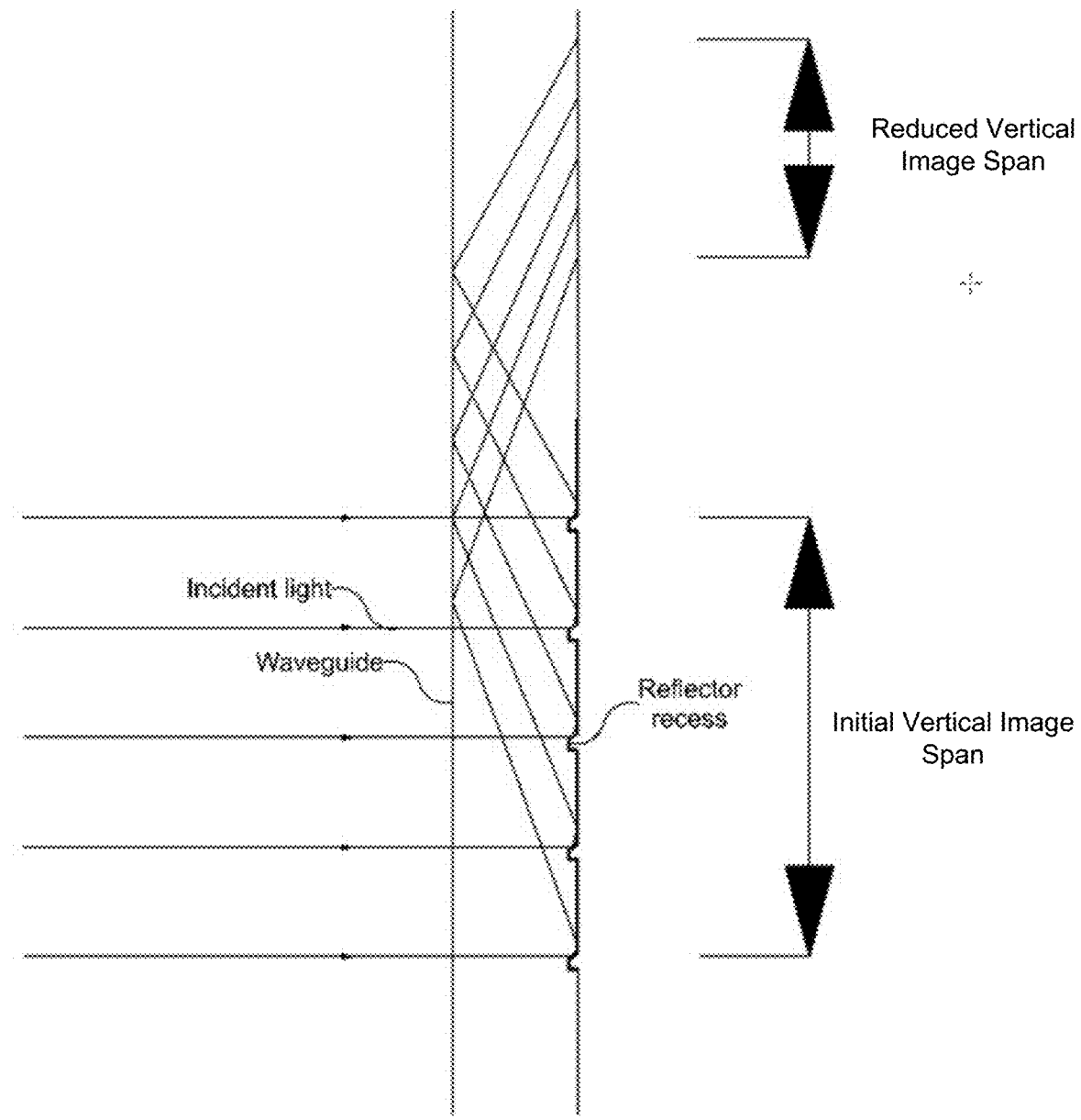
FIG. 19 shows reflective structures for reducing the vertical span of an external scene image based on changing the angles of the reflecting surfaces, according to an embodiment

FIG. 19 shows a method for reducing the vertical span of an external scene image based on changing the angles of the reflecting surfaces, according to an embodiment. Although 'vertical' is mentioned, this could be done any axis.

Overlapping external scene images caused by a vertical micro-structure array dimension greater than the interval between TIR reflections can be tolerated, and the external scene images separated by post-processing. This can be facilitated by directing light from a given region of the imaging surface (one or more micro-structures) to arrive at discrete and separate regions of the imager surface. The micro-structures are then configured such that a given combination of imager pixel values is unique to one location in the overall external scene image, and overlapping images can be separated.

In some embodiments, source separation techniques such as Independent Component Analysis are used to separate images which overlap in the waveguide and arrive as a set of combined images at the imaging system. Machine learning methods can be used to determine when a plausible scene has been reconstructed by the source separation, the machine learning system having been trained with a large number of representative scene images. A typical set of overlapping images can be determined to be successfully separated when the spatial and temporal (if more than one frame over time is used) continuity of each component image is increased (e.g., maximized).

Some applications may not require a particularly high-resolution image. For example, tracking gestures or facial features can be done with a relatively low imager pixel count. In a video call application, where high resolution external scene images of the face may be desirable, two possible approaches can be adopted based on the above imaging methods:

1. Use the low-resolution image to track facial features and apply those to a high resolution synthetic representation of the face derived from a computer model or from high resolution images acquired by one or more imagers that directly capture images of the external scene (for example, cameras which are around the edges of the display area). These additional imagers can acquire high resolution external scene images as the user approaches the display, for example, and these can be manipulated using digital image processing methods informed by the facial mapping data from the waveguide-based imager (i.e., the imager that receives external scene light via the waveguide).

2. Use relative motion of the waveguide and user to acquire additional images which can be synthesized into a high-quality image representation of the user. Even if the number of pixels in the waveguide-based imager output is relatively small, the spatial extent of each pixel can also be small and the pixels can be relatively spread out. In other words, the waveguide-based imager output can be a spatially sparse image. Since movement between a user and the distributed micro-structures is likely, information from between the spatially sparse image sampling points can be filled in to increase the effective resolution. This can be done using motion vectors or fine location approximation based on the waveguide imager output.

In some embodiments, ideally, the elevation angle of the external scene image light propagating in the waveguide is small:

1. Small elevation angles in the waveguide correspond to large angles of incidence with the waveguide surface which sustains TIR even when there are contacts (e.g., touch events) or contaminants on the touch surface (or the display side surface of the waveguide).

2. Small elevation angles in the waveguide give rise to large intervals between reflections off the waveguide surface. This results in fewer reflections (e.g., resulting in reduced image distortion) and a larger distance before successive portions of the external scene overlap.

It may be desirable for the optical micro-structures to not be noticeable. Thus, it can be advantageous to extend the micro-structure array over the entire display area e.g., even if only a portion (or more than one portion) of the waveguide surface is intended as an entry point for external scene image light. For example, the imaging optical system is configured such that the waveguide-based imager only receives external scene light entering the waveguide in a center region of the display. Optical micro-structures may be placed along the entire waveguide (e.g., to reduce the noticeability of the structures), however structures outside of the center region may not direct light to the imager.

Micro-structures not involved in external scene image capture can be isolated by:

1. Being subtly different in design so that little or no light coupling into the waveguide occurs. This method may rely on the isolated structures not presenting much disturbance (usually because they occupy a small proportion of waveguide surface) to wanted image light paths.

2. Interposing a low refractive index layer between the reflectors to be isolated and the waveguide (and for example masking or removing this low refractive index layer for non-isolated structures). This method also prevents isolated structures from disrupting the wanted image paths.

Method 2 can be implemented in a number of ways. For example, a UV nanolithography process can be used to fabricate reflecting micro-structures onto a film or sheet substrate. That substrate may be the waveguide or it may be attached to the waveguide. Such a fabrication method usually involves a liquid material being coated onto the substrate and then being cured into the desired shape (i.e. with the micro-structures included in the surface). This fabrication method can be preceded by the application of a thin (usually in the range 0.5 um to 4 um) layer of a low refractive index 'barrier' layer. This barrier layer can be masked off (coating not present) in the areas where image ingress is intended. Where the barrier layer is present, a reflector still reflects light into an angle which would propagate in the waveguide, but the light cannot enter the waveguide because it is reflected by TIR when it reaches the barrier layer. In this way, the micro-structures can be present over the whole display surface, but only a subset of them actually contribute to image formation.

Where the substrate layer with the barrier layer and micro-structures is attached to the waveguide, a barrier masking layer can be alternatively located between the waveguide and barrier layer instead.

Other light can be introduced into the same waveguide for alternative purposes. For example, an infrared imaging system based on these principles can carry infrared light from a source outside of the display active area such that it propagates at an angle which passes through the barrier layer (if there is one) and is radiated by micro-structures on the waveguide surface which cause the light to 'leak' from the waveguide to illuminate the area in front of the waveguide. This allows a reasonably well-lit image to be captured even in darkness.

As previously stated, the waveguide of this imaging optical system can also be an optical touch sensing waveguide of the optical touch-sensitive device 100 previously described. Even if no barrier layer is used, the loss of touch sensing light into the micro-structures used for image acquisition is generally small because of the small proportion of the waveguide surface they constitute. Where a barrier layer is used and the touch sensing system uses a compatible elevation angle for touch sensing light, there may be little or no loss into the barrier layer. Only those areas where there is no barrier layer (such as where there are micro-structures carrying imaging light into the waveguide) may be lossy to the touch sensor. Since those are static and permanent, the touch sensing system can ignore them. In this way, the imaging function and an optical touch sensing function may be combined using a common waveguide.

V. Applications

The touch-sensitive devices and methods described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

VI. Additional Considerations

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein.

What is claimed is:

1. An imaging optical system comprising:
    an imaging device;
    an optical waveguide optically coupled to the imaging device and extending over at least part of a base surface, the optical waveguide including a first surface facing an external environment and a second surface opposite the first surface and facing the base surface, wherein the base surface is a light emitting area of a display and light output from the light emitting area passes through the first and second surfaces of the optical waveguide; and
    one or more optical structures on at least one of: the first surface or the second surface, the one or more optical structures configured to couple a portion of incident light from the external environment into the optical waveguide, the one or more optical structures directing the portion of the incident light to propagate through the optical waveguide via total internal reflection towards the imaging device, wherein an area of an optical structure of the one or more optical structures is less than an area of a pixel of the display as seen from a view perpendicular to the first or second surface of the optical waveguide.

2. The imaging optical system of claim 1, wherein the first surface of the optical waveguide is a touch sensitive surface, and touches are detected on the touch sensitive surface based on disruption of optical beams propagating through the optical waveguide.

3. The imaging optical system of claim 1, wherein the one or more optical structures include a lens on the first surface and one or more additional structures on the second surface, the lens configured to focus the portion of incident light towards the one or more additional structures and the one or more additional structures are configured to direct the portion of incident light towards the imaging device.

4. The imaging optical system of claim 1, wherein the one or more optical structures protrude from the optical waveguide.

5. The imaging optical system of claim 1, wherein the one or more optical structures are recessed into the optical waveguide.

6. The imaging optical system of claim 1, wherein an optical structure on the first surface couples the light from the external environment into the optical waveguide via refraction.

7. The imaging optical system of claim 1, wherein an optical structure is metalized and reflects the light from the external environment towards the imaging device.

8. The imaging optical system of claim 1, further comprising:
    additional optical structures on the first or second surface of the optical waveguide; and
    a barrier layer between the optical waveguide and the additional optical structures, the barrier layer preventing light incident on the additional optical structures from entering the optical waveguide.

9. The imaging optical system of claim 1, further comprising additional optical structures on a same surface as the one or more optical structures, wherein the additional optical structures have a different structure than the one or more optical structures such that light incident on the additional optical structures is not directed towards the imaging device.

10. The imaging optical system of claim 9, wherein the one or more optical structures are located in a center region of the optical waveguide and the additional optical structures are located outside of the center region.

11. The imaging optical system of claim 1, further comprising a coating between the second surface of the optical waveguide and the display, the coating having a refractive index less than a refractive index of the optical waveguide.

12. The imaging optical system of claim 1, wherein the one or more optical structures are configured such that, when a user is in front of the display, light reflected from the user is directed to propagate through the optical waveguide to the imaging optical system.

13. The imaging optical system of claim 1, wherein the imaging device is located at a periphery of the display.

14. The imaging optical system of claim 1, wherein the one or more optical structures are spaced apart over an area corresponding to a display area of the display.

15. The imaging optical system of claim 1, wherein an optical structure is on a surface of the optical waveguide and has a height between 200 nanometers and 100 micrometers as measured from the surface.

16. The imaging optical system of claim 1, wherein the imaging device captures an image of the external environment, the image having a viewpoint from the optical waveguide.

17. The imaging optical system of claim 1, wherein the one or more optical structures focus the portion of incident light from the external environment towards the imaging device.

18. The imaging optical system of claim 1, wherein the number of one or more optical structures on the waveguide is more than one per pixel of the imaging device.

19. The imaging optical system of claim 1, wherein the optical structure and another optical structure are within the area of the pixel of the display as seen from a view perpendicular to the first or second surface of the optical waveguide.

20. The imaging optical system of claim 1, wherein the one or more optical structures are arranged at a spacing which is not related to spacing of pixels in the display.

\* \* \* \* \*